US012741511B2

(12) United States Patent
Okuno et al.

(10) Patent No.: US 12,741,511 B2
(45) Date of Patent: Sep. 22, 2026

(54) REGISTER

(71) Applicants: HOWA PLASTICS CO., LTD., Toyota (JP); ULTRA MANUFACTURING LIMITED, Kitchner (CA)

(72) Inventors: Katsuaki Okuno, Toyota (JP); Yoshiki Torii, Toyota (JP)

(73) Assignees: HOWA PLASTICS CO., LTD., Toyota (JP); ULTRA MANUFACTURING LIMITED, Kitchner (CA)

( * ) Notice: Subject to any disclaimer, the term of this patent is extended or adjusted under 35 U.S.C. 154(b) by 342 days.

(21) Appl. No.: 18/682,308

(22) PCT Filed: May 26, 2022

(86) PCT No.: PCT/JP2022/021573
§ 371 (c)(1),
(2) Date: Feb. 8, 2024

(87) PCT Pub. No.: WO2023/021805
PCT Pub. Date: Feb. 23, 2023

(65) Prior Publication Data

US 2024/0351401 A1 Oct. 24, 2024

(30) Foreign Application Priority Data

Aug. 19, 2021 (JP) ................................ 2021-134123

(51) Int. Cl.
*B60H 1/34* (2006.01)

(52) U.S. Cl.
CPC ... *B60H 1/3421* (2013.01); *B60H 2001/3478* (2013.01)

(58) Field of Classification Search
CPC ........... B60H 1/3421; B60H 2001/3478; F24F 13/1426; F24F 13/15
(Continued)

(56) References Cited

U.S. PATENT DOCUMENTS 10,823,450 B2 11/2020 Terasawa
2002/0081965 A1 6/2002 Demerath et al.
(Continued)

FOREIGN PATENT DOCUMENTS

CN 206031001 U 3/2017
DE 10 2015 101 116 A1 8/2015
(Continued)

OTHER PUBLICATIONS

Dec. 3, 2024 Office Action issued in Japanese Patent Application No. 2021-134123.
(Continued)

*Primary Examiner* — Michael G Hoang
*Assistant Examiner* — Elizabeth Ann Laughlin
(74) *Attorney, Agent, or Firm* — Oliff PLC

(57) ABSTRACT

In a register 10, coupling between a transmission shaft 65 and a dial control knob 21 and coupling between the transmission shaft 65 and a boss member 73 are each made with a universal joint. Rotation of the dial control knob 21 is transmitted to a damper 19 via the transmission shaft 65, the boss member 73, and a cam member 75. A case member 74 rotatably holds the boss member 73 and the cam member 75. A boss pivot 74F of the boss member 73 is offset from a camshaft 75B of the cam member 75 in a direction perpendicular to the axial direction of the boss pivot 74F. Accordingly, the cam member 75 rotates about a rotation center eccentric from the boss member 73 as the boss member 73 rotates to open and close the damper 19.

9 Claims, 28 Drawing Sheets

(58) Field of Classification Search
USPC .......................................................... 454/155
See application file for complete search history.

(56) References Cited

U.S. PATENT DOCUMENTS

| | | | |
|---|---|---|---|
| 2017/0259649 | A1 | 9/2017 | Shibata et al. |
| 2018/0283729 | A1 | 10/2018 | Terasawa |
| 2019/0126728 | A1 | 5/2019 | Park |

FOREIGN PATENT DOCUMENTS

| | | | |
|---|---|---|---|
| JP | H06-117677 | A | 4/1994 |
| JP | 2009-166677 | A | 7/2009 |
| JP | 2010-105507 | A | 5/2010 |
| JP | 2017-159826 | A | 9/2017 |
| JP | 2018-171962 | A | 11/2018 |
| JP | 2019-084854 | A | 6/2019 |

OTHER PUBLICATIONS

Apr. 11, 2025 Extended European Search Report issued in European Patent Application No. 22858129.4.
Aug. 16, 2022 International Search Report issued in International Patent Application No. PCT/JP2022/021573.

10
11
19
81
82
23
25
27
82A
81A
76
83B(83)
83F
83G
75
74
B
C
85
73
65
41
49
45
59
63
32
55
15
52
13
13A
21
51
51A
LEFT
RIGHT
REAR
(Upstream)
FRONT
(Downstream)

17
39
39B
39A
45
47
41D
41B
41
41A
41E
49
UPPER
LOWER
LEFT
RIGHT
15
31
31A
31B
35
37
32
32A
32B
32D
33

10
11
23
25
19
81
82A
81A
82
27
27
76
83B(83)
83F
83G
75
85
73
65
41
49
45
45
59
63
32
55
15
52
13
13A
21
51
21
51A
LEFT
REAR
(Upstream)
RIGHT
FRONT
(Downstream)

REGISTER

CROSS-REFERENCE TO RELATED APPLICATIONS

This application is based upon and claims the benefit of priority of the prior Japanese Patent Application No. 2021-134123, filed on Aug. 19, 2021, the entire contents of which are incorporated herein by reference.

FIELD

The present application relates to a register used in an air blow outlet for performing ventilation and air conditioning, and relates to a damper for opening and closing an air passage.

BACKGROUND

An example of a register used in air blow outlets is a register installed in an instrument panel of a vehicle to blow out air-conditioning air delivered from an air conditioner. In the register disclosed in Patent Document 1 below, an air blow outlet, horizontal fins, vertical fins, and a damper are arranged in this order from downstream to upstream of an air passage. This register includes a transmission shaft that transmits a rotational movement of a control knob to the damper and a rotation conversion mechanism that is coupled to the transmission shaft to open and close the damper. Coupling between the transmission shaft and the control knob and coupling between the transmission shaft and the rotation conversion mechanism are each made with a joint mechanism, such as a universal joint or a ball joint.

[Patent Document 1] German Unexamined Patent Application Publication No. 10201 5101116

SUMMARY

In a register that uses joint mechanisms as described above, when an intersecting angle between axes of the control knob and the transmission shaft and an intersecting angle between axes of the transmission shaft and the rotation conversion mechanism is large, rotational misalignment that develops between the control knob and the rotation conversion mechanism can be large. Accordingly, for example, it is possible that even when the control knob is turned in an air-passage closing direction, the damper does not tilt to a closed position and fails to close the air passage, or tilts excessively, causing interference between the damper and a retainer. Also when the control knob is turned to an air-passage opening direction, the rotational misalignment described above can cause the damper to fail to tilt appropriately.

The present application is made to solve the problem described above and aims at providing a register that can eliminate excessive or insufficient tilting of the damper.

According to one aspect of the present disclosure, a register comprising: a damper drive mechanism for tilting a damper that tilts between an open position where an air passage is open and a closed position where the air passage is closed by transmitting rotation, while changing a direction thereof, of a control knob transmitted from the control knob via a transmission shaft to the damper to tilt the damper between the open position and the closed position, the damper drive mechanism comprising: a boss member coupled to the control knob via the transmission shaft; a case member holding the boss member rotatably about a boss pivot; and a cam member held by the case member rotatably about a camshaft and coupled to the boss member, the cam member rotating in accordance with rotation of the boss member to tilt the damper, wherein coupling between the transmission shaft and the control knob and coupling between the transmission shaft and the boss member are each made with a joint mechanism, and the case member holds the camshaft at a position offset from a straight line that is along an axial direction of the boss pivot in a direction perpendicular to the axial direction of the boss pivot to rotate the cam member about the camshaft that is eccentric in accordance with the rotation of the boss member.

The object and advantages of the invention will be realized and attained by means of the elements and combinations particularly pointed out in the claims. It is to be understood that both the forgoing general description and the following detailed description are exemplary and explanatory and are not restrictive of the invention.

DESCRIPTION OF EMBODIMENTS

Figure 1:
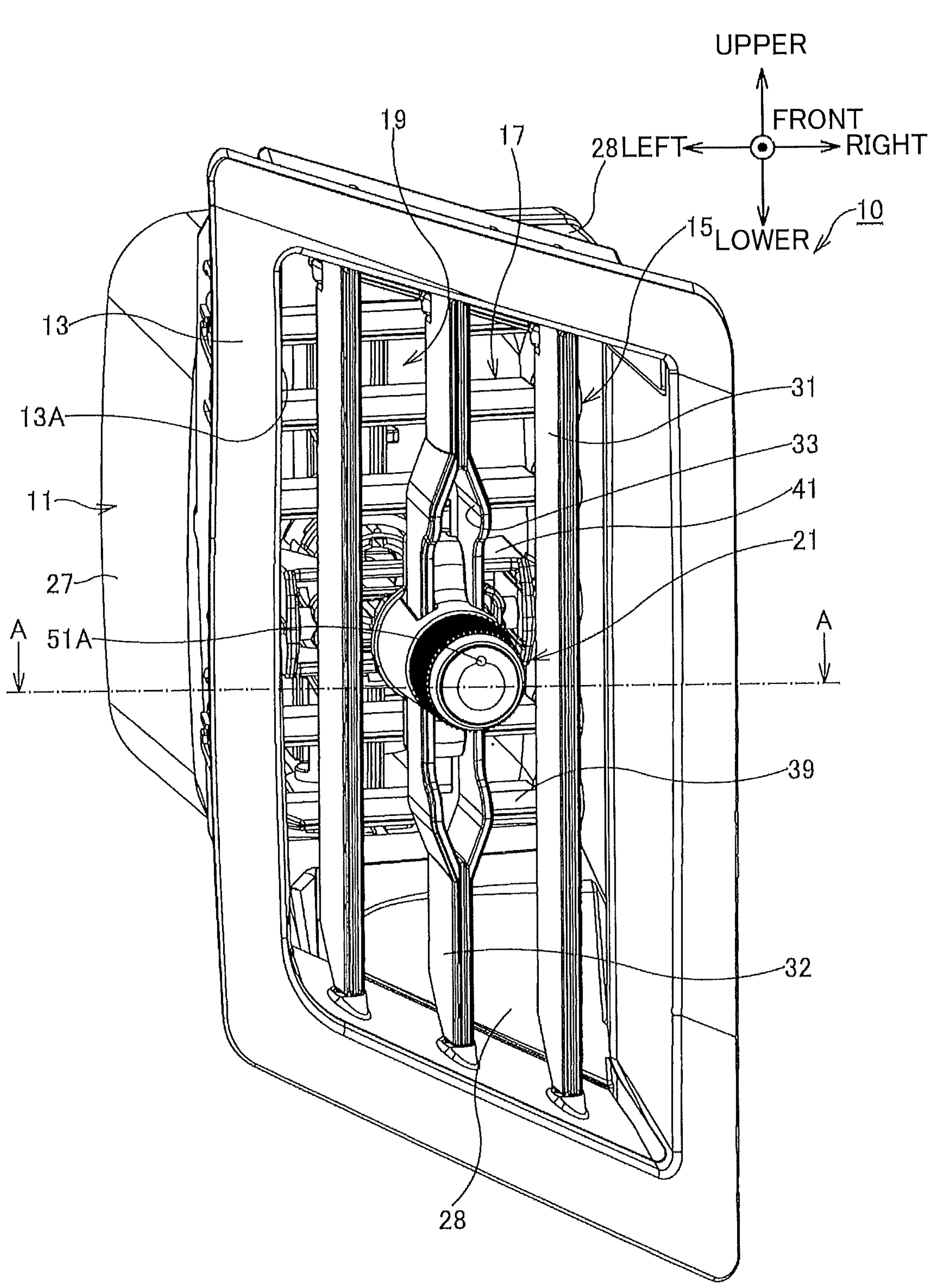
FIG. 1 is a perspective view of a register according to the present embodiment.

Hereinafter, a register according to the present application is described with reference to drawings through an embodiment as a register 10 that is installed in an instrument panel arranged in a front portion of a cabin of an automobile or the like to blow out air conditioning air adjusted by an air conditioner into the cabin. Note that figures used in the description may include schematically illustrated portions, and the shape and the like of each portion may not necessarily be stringent. In the description below, as illustrated in FIG. 1, a downstream side (i.e., the cabin side) in an air-blowing direction in the register 10 of the present embodiment is described as a front side, and an upstream side (i.e., the air conditioner side) in the air-blowing direction is described as a rear side. In the description below, a vertical direction and a lateral direction are defined and described using a point of view of a user facing the register 10 from the front side of the register 10. FIG. 1 illustrates a state where a downstream fin set 15 is placed along the vertical direction, an upstream fin set 17 is placed along the lateral direction, and a blow-out direction of the air-conditioning air is not changed (hereinafter, sometimes referred to as a neutral state). FIG. 1 illustrates a state where a dial control knob 21 is arranged at an open position for opening a damper 19.

In a vehicle's cabin, for example, an instrument panel (not illustrated) may be provided forward of front seats (a driver's seat and a front passenger seat) of the vehicle. The register 10 may be installed at, for example, a center portion in the lateral direction (vehicle width direction) or a side portion of the instrument panel. The register 10 changes a direction of air-conditioning air delivered from an air conditioner (not illustrated) with the downstream fin set 15 and the upstream fin set 17 to blow it out into the cabin from an air blow outlet 13A. The register 10 also adjusts a blow-out amount of the air-conditioning air with the damper 19. Adjustment of the blow-out amount in the present application is a concept including bringing the damper 19 to the closed position to shut off blowing out.

Figure 2:
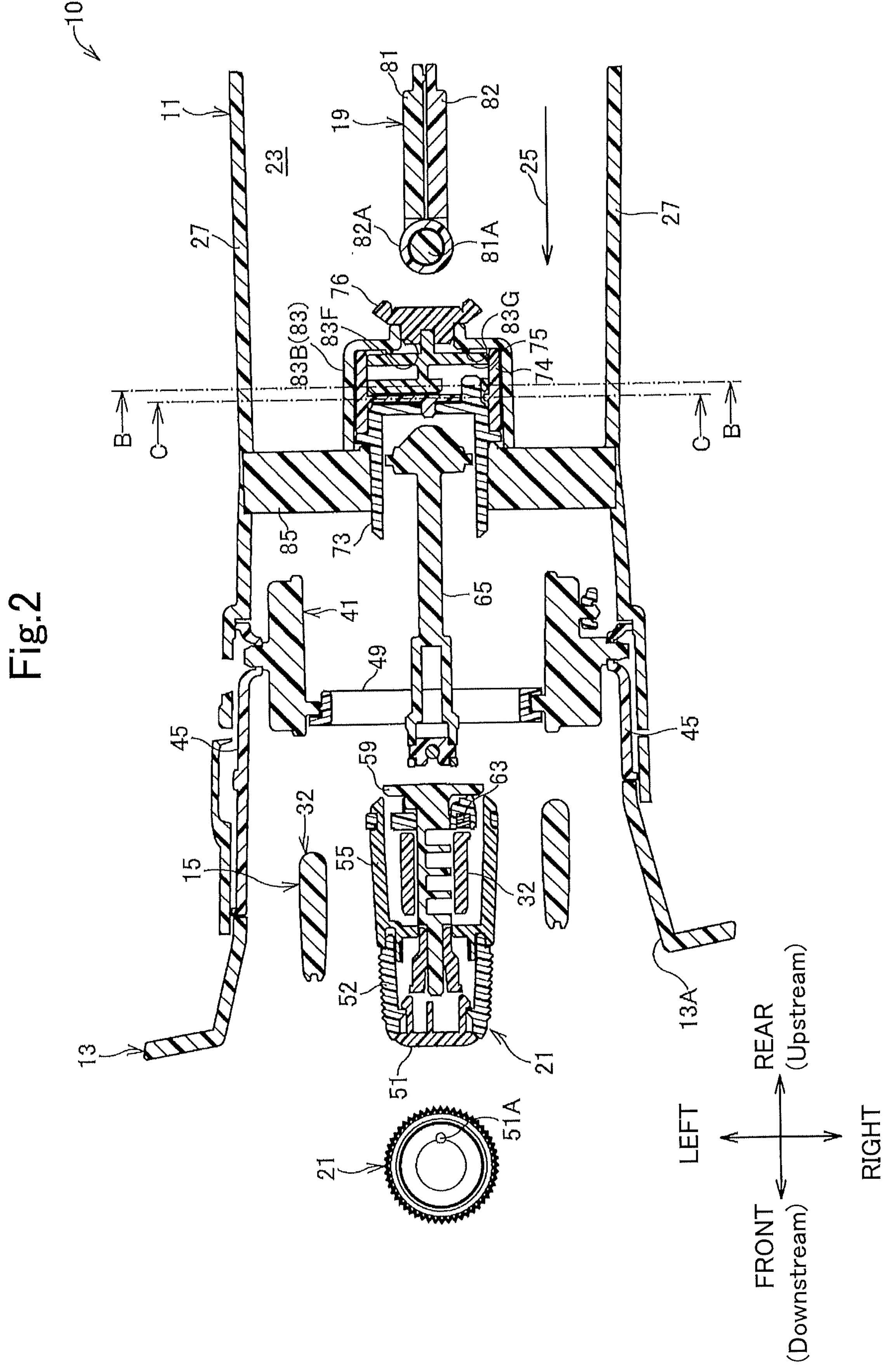
FIG. 2 is a diagram of a dial control knob as viewed from its front and a cross-sectional view illustrating a section taken along the line A-A illustrated in FIG. 1.

As illustrated in FIG. 1 and FIG. 2, the register 10 includes a retainer 11, a bezel 13, the downstream fin set 15, the upstream fin set 17, the damper 19, and the dial control knob 21. The register 10, except for some parts such as a leaf spring 62 which will be described later, may be formed from a synthetic resin (such as polybutylene terephthalate (PBT) or ABS resin), for example. The retainer 11 has a cylindrical shape extending in the front-rear direction. An air passage 23 is formed inside the retainer 11. The retainer 11 is connected at its rear end portion to the air conditioner via the air passage 23. In the neutral state, air-conditioning air blown from the air conditioner is blown into the air passage 23 in an air-blowing direction 25 along the front-rear direction. The air passage 23 is shaped to have a vertically-elongated substantially rectangular cross-section taken along a plane perpendicular to the front-rear direction. The air passage 23 is surrounded by four side walls of the retainer 11. These four wall portions are a single pair of side walls 27 facing each other in the lateral direction and a pair of side walls 28 facing each other in the vertical direction.

The bezel 13 is attached to a lower end portion of the retainer 11. The air blow outlet 13A, which has a vertically-elongated substantially rectangular shape, is formed in the bezel 13. A portion, which is a downstream end face of the bezel 13 and is a circumference of the air blow outlet 13A, serves as a design surface of the register 10. The retainer 11 is in communication with the air blow outlet 13A to deliver the air-conditioning air to the air blow outlet 13A along the air-blowing direction 25. In the description below, description is made by referring to the air conditioner side as "upstream" in the air-blowing direction 25, and the bezel 13 side or a zone forward of the bezel 13 as "downstream."

(The Downstream Fin Set 15)

Figure 3:
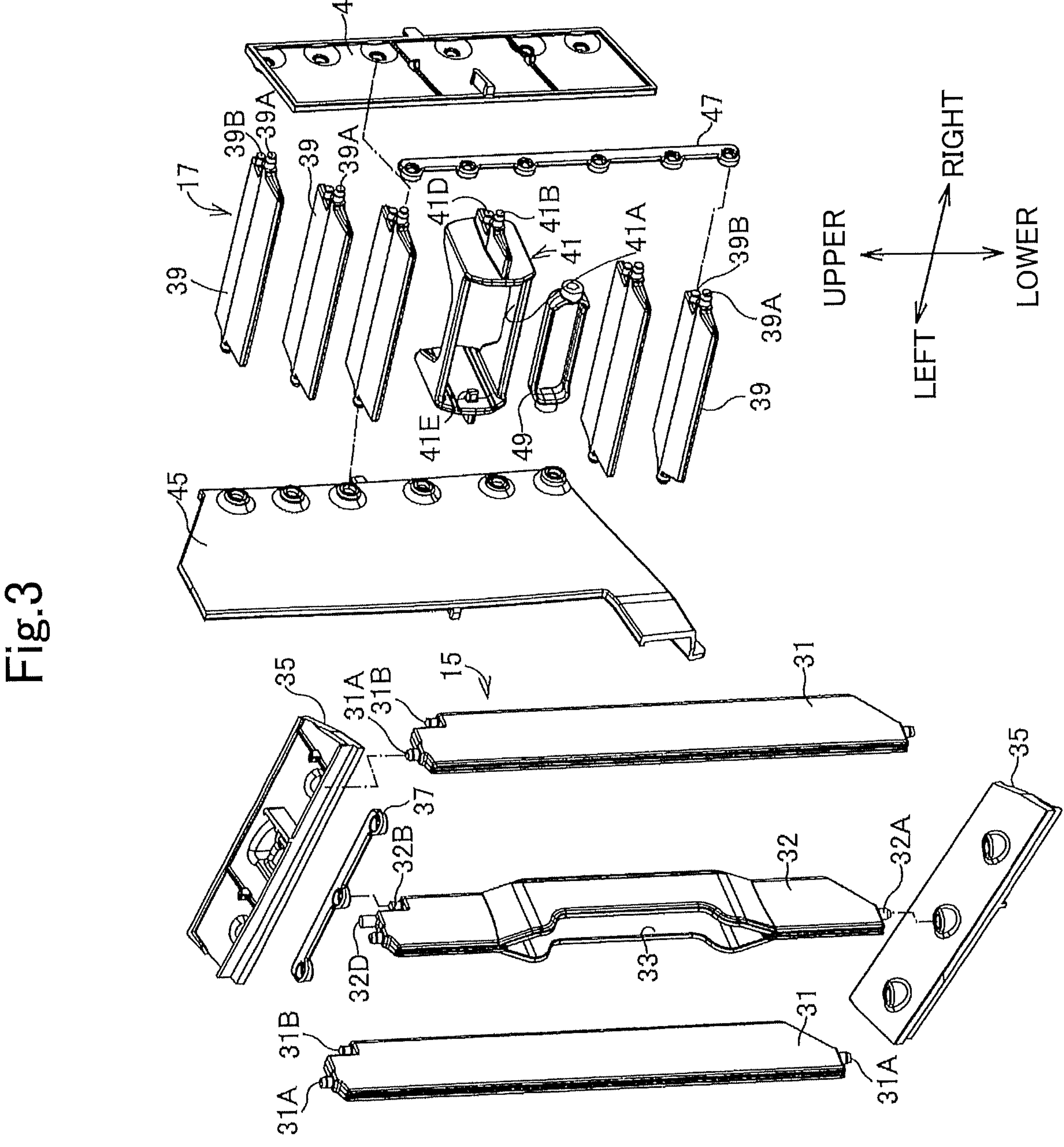
FIG. 3 is a perspective view illustrating some components of the register.

FIG. 3 presents an exploded perspective view of some components (the downstream fin set 15 and the upstream fin set 17) of the register 10. As illustrated in FIG. 1 to FIG. 3, the downstream fin set 15 is arranged inside a portion where the bezel 13 and the retainer 11 are connected. The downstream fin set 15 includes two downstream fins 31 and a downstream fin 32, which is arranged between the two downstream fins 31 in the lateral direction. The downstream fin 32 is identical in configuration with the downstream fins 31 except for a mounting hole 33 and a regulation pin 32D, which will be described later. The downstream fins 31, 32 are arranged as being aligned and equally spaced from each other in the lateral direction. The downstream fins 31 have a predetermined thickness in the lateral direction and are shaped like a vertically-elongated substantially rectangular plate. The downstream fin 32 has both sides portions in the left and right direction shaped like a vertically-elongated substantially rectangular plate and the mounting hole 33 that is formed at a center portion in the vertical direction. The downstream fin 32 is laterally thicker at a portion, at which the mounting hole 33 is formed, to have a shape bulged (expanded) toward the downstream fins 31. The downstream fins 31, 32 are held at each of downstream fin pivots 31A, 32A by bearing members 35 attached to the single pair of side walls 27 to thus be held rotatably relative to the retainer 11. The downstream fins 31, 32 rotate about rotation axes that are along the vertical direction.

The downstream fins 31, 32 are coupled at each of regulation pins 31B, 32B by a link bar 37. Accordingly, in synchronization with rotation of any downstream fin of the two downstream fins 31 and the downstream fin 32, the remainder downstream fins also rotate. The downstream fin set 15 rotates the downstream fins 31, 32 laterally in accordance with an operation of laterally moving the dial control knob 21 attached to the downstream fin 32, thereby changing a blow-out direction, in which the air-conditioning air is blown out from the air blow outlet 13A, laterally.

The dial control knob 21 is, in a state supported on the downstream fin 32, capable of vertical sliding movement in the mounting hole 33. The regulation pin 32D, which is to be inserted into a regulation hole (not illustrated) in the upper one of the bearing members 35, is provided on an upper end of the downstream fin 32. The regulation pin 32D is inserted into the regulation hole to restrict a rotation range of the downstream fin 32. Thus, a range of lateral rotation of the downstream fin set 15 is restricted to a predetermined range.

(The Upstream Fin Set 17)

The upstream fin set 17 is provided in the retainer 11 to be upstream of the downstream fin set 15. The upstream fin set 17 includes a plurality of (in the present embodiment, five) upstream fins 39 and an auxiliary fin member 41. The five upstream fins 39 and the auxiliary fin member 41 are arranged as being aligned and spaced from each other in the vertical direction. Three of the upstream fins 39 are arranged above the auxiliary fin member 41, and two of the upstream fins 39 are arranged below the same. The upstream fins 39 have a predetermined thickness in the vertical direction and are shaped like a laterally-elongated substantially rectangular plate. The auxiliary fin member 41 has a laterally-elongated cylindrical shape as viewed from the front side and has a through hole 41A passing through in the front-rear direction. The through hole 41A is shaped to have a vertically-elongated substantially rectangular cross-section taken along a plane perpendicular to the front-rear direction. The upstream fins 39 and the auxiliary fin member 41 are held at each of upstream fin pivots 39A, 41B by bearing members 45 each provided on one of the single pair of side walls 27, and the upstream fins 39 and the auxiliary fin member 41 are to be held rotatably relative to the retainer 11. The upstream fins 39 and the auxiliary fin member 41 rotate about rotation axes that are along the lateral direction.

The upstream fins 39 and the auxiliary fin member 41 are coupled at each of regulation pins 39B, 41D by a link bar 47. Accordingly, in synchronization with rotation of any fin of the five upstream fins 39 and the auxiliary fin member 41, the remainder fins also rotate. In the upstream fin set 17, when the dial control knob 21 of the downstream fin 32 is moved vertically, the motion of the dial control knob 21 is transmitted to an annular member 49 of the auxiliary fin member 41 via a transmission shaft 65 (see FIG. 4), which will be described later, and vertically rotates the upstream fins 39 and the auxiliary fin member 41. Wall portions that face each other in the vertical direction to define the through hole 41A of the auxiliary fin member 41 have a thin-plate-like shape and function as fins that change flows of the air-conditioning air. The upstream fin set 17 vertically rotates the upstream fins 39 and the auxiliary fin member 41 to change the blow-out direction, in which the air-conditioning air is blown out from the air blow outlet 13A, vertically.

(The Dial Control Knob 21, etc.)

Figure 4:
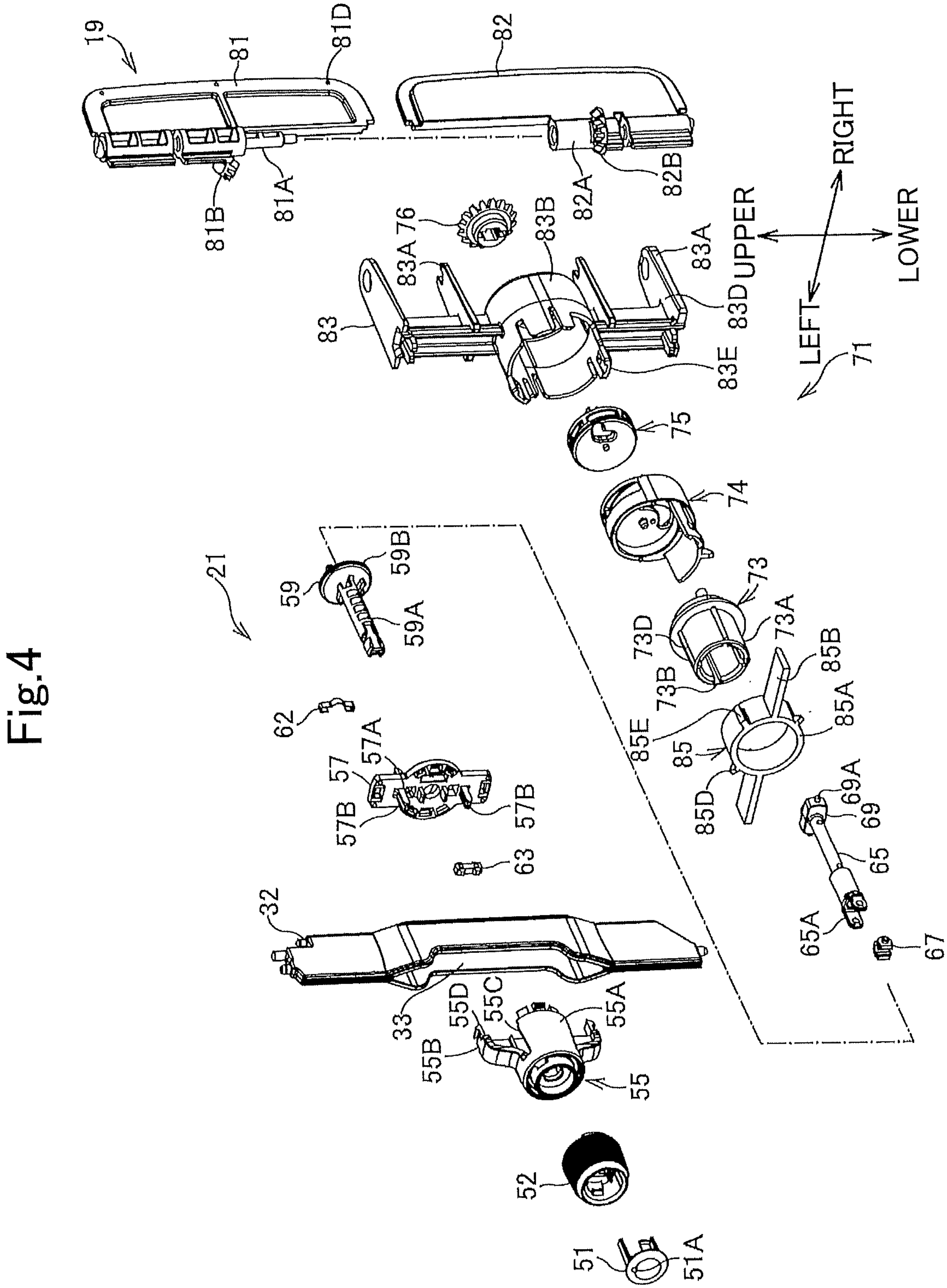
FIG. 4 is a perspective view illustrating some components of the register.
Figure 5:
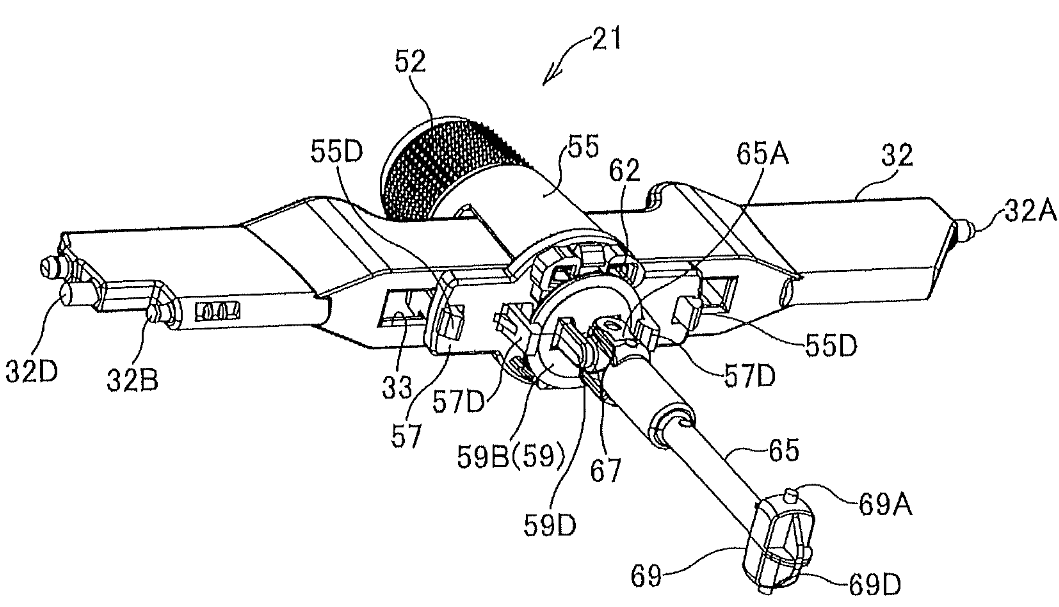
FIG. 5 is a perspective view of the dial control knob, a transmission shaft, and the like as viewed from upstream.

As illustrated in FIG. 4 and FIG. 5, the dial control knob 21 includes a dial disk 51, a dial portion 52, a dial cover 55, a mounting plate 57, a coupling shaft 59, and the like. The dial disk 51 is attached to a front face of the dial portion 52, which is cylindrical, and turns with the dial portion 52. A position mark 51A indicating a rotational position of the dial control knob 21 is provided on the dial disk 51. The dial portion 52 has a cylindrical shape. Processing, such as knurling, for preventing slippage of fingers operating the dial control knob 21 is applied to an outer peripheral surface of the dial portion 52.

The dial cover 55 includes extended portions 55B that extend from a body portion 55A, which is cylindrical, on both upper and lower sides and includes four slits 55C between the body portion 55A and the extended portions 55B in a circumferential direction. Portions, which define the mounting hole 33, of the downstream fin 32 are inserted from upstream into the respective four slits 55C. Thus, the dial control knob 21 with the mounting hole 33 partially inserted into the slits 55C is capable of sliding movement parallel to the axial direction (the vertical direction) of the downstream fin 32.

The mounting plate 57 has a predetermined thickness in the lateral direction and is shaped like a vertically-elongated substantially rectangular plate, and has a through hole 57A at a center in the vertical direction. The mounting plate 57 also has an engaging portion 57B on each of the upper and lower sides of the through hole 57A. Each of the engaging portions 57B, which constitute a pair, has a rod-like shape projecting downstream. The coupling shaft 59 includes a shaft portion 59A, which is rod-like, and a disk portion 59B provided at an upstream end of the shaft portion 59A. The shaft portion 59A extends perpendicularly with respect to a downstream face of the disk portion 59B.

The mounting plate 57 is locked by insertion of engaging claws 55D provided at upstream ends (distal ends) of the extended portions 55B of the dial cover 55, thereby being fixed relative to the dial cover 55. The coupling shaft 59 is inserted from upstream into the dial cover 55 through the through hole 57A in the mounting plate 57. The dial portion 52 is fixed to a downstream end (distal end) of the shaft portion 59A. The dial disk 51, the dial portion 52, and the coupling shaft 59 are held by the dial cover 55 rotatably about an axis that is along the front-rear direction. The engaging portions 57B of the mounting plate 57 are inserted from upstream into the mounting hole 33. Thus, the engaging portions 57B restrict lateral movement of the dial control knob 21 relative to the downstream fin 32. The dial control knob 21 can be vertically moved stably by sliding relative to the downstream fin 32.

The disk portion 59B of the coupling shaft 59 is positionally restricted in an axial direction of the shaft portion 59A by being engaged by claw portions 57D, which constitute a pair, provided on an upstream face of the mounting plate 57. Meanwhile, the disk portion 59B in a state of being locked by the claw portions 57D is supported rotatably about the axial direction of the shaft portion 59A relative to the mounting plate 57. The coupling shaft 59 rotates integrally with the dial disk 51 and the dial portion 52. The leaf spring 62 is attached to the upstream face of the mounting plate 57. The leaf spring 62 provides a tactile click feel to the dial control knob 21. For example, a protrusion provided on the leaf spring 62 may be elastically insertable into a recess provided in the disk portion 59B. The leaf spring 62 may be configured such that, for example, when the dial control knob 21 (the dial portion 52) is turned to the open position for opening the damper 19 or a closed position for closing the damper, the protrusion elastically fit in the recess. Thus, an appropriate tactile click feel can be applied to fingers of a user operating the dial control knob 21 coincidently with an opening or closing movement of the damper 19. In addition, the rotational position of the dial control knob 21 can be held at the open position and the closed position for the damper 19, and furthermore, backlash of the coupling shaft 59 can be prevented or reduced.

The mounting plate 57, with a load applying member 63 attached to its downstream face, is attached to the downstream fin 32. When the dial control knob 21 is moved by sliding it, the load applying member 63 slides with the downstream fin 32, and is to apply an appropriate load by friction. Thus, the load applying member 63 applies an appropriate tactile click feel to fingers of the user operating the dial control knob 21 and, simultaneously, can prevent or reduce fluctuations of the sliding position of the dial control knob 21 relative to the mounting hole 33.

The transmission shaft 65 is attached to an upstream face of the disk portion 59B. A swing coupling portion 65A, which is bifurcated, is provided on a downstream end portion of the transmission shaft 65. A swing coupling member 67 is rotatably attached to the inner side of the bifurcation portion of the swing coupling portion 65A. The swing coupling member 67 is pivotally supported by the swing coupling portion 65A to be pivotable about an axis perpendicular to the axis of the transmission shaft 65. In addition, the swing coupling member 67 is rotatably fit into (pivotally supported by) a shaft portion 59D provided on the upstream face of the disk portion 59B. The swing coupling member 67 is pivotally supported by the shaft portion 59D to be pivotable about an axis that is perpendicular to the axis of the transmission shaft 65 and also perpendicular to the axis, about which the swing coupling member 67 is pivotally supported by the swing coupling portion 65A. Thus, the transmission shaft 65 is coupled to the coupling shaft 59 (the dial control knob 21) with a universal joint (a joint mechanism) to be rotatable/swingable between the shaft portion 59A of the coupling shaft 59 and the transmission shaft 65 in every direction perpendicular to one of their axes, and can transmit a torque about the axis of the shaft portion 59A (the dial control knob 21).

Furthermore, a universal-joint engaging portion 69 having a substantially rectangular parallelepiped shape is provided on an upstream end portion of the transmission shaft 65. A pin 69A is provided on each of outer peripheral surfaces, in directions perpendicular to the axial direction of the transmission shaft 65, of the universal-joint engaging portion 69. The pins 69A, which constitute a pair, outwardly protrude in directions perpendicular to the outer peripheral surfaces of the universal-joint engaging portion 69 (the directions perpendicular to the axis of the transmission shaft 65). Rotation of the transmission shaft 65, i.e., rotation of the dial control knob 21, is transmitted to the damper 19 via a damper drive mechanism 71, which will be described later. The universal-joint engaging portion 69 is inserted into a boss member 73 of this damper drive mechanism 71.

A cylindrical portion 73A is provided in a downstream portion of the boss member 73. Four grooves 73B are formed in an inner wall of the cylindrical portion 73A along an axial direction of the cylindrical shape. The four grooves 73B are formed at 90-degree circumferential spacing and each formed from an opening to a bottom of the cylindrical portion 73A along the axial direction of the cylindrical portion 73A. The pins 69A, which constitute a pair, of the universal-joint engaging portion 69 are inserted into two of the four grooves 73B to be engaged in the grooves 73B and movable along the grooves 73B. The transmission shaft 65 with the pins 69A inserted into the grooves 73B is swingable relative to the boss member 73. Furthermore, as will be described later, the boss member 73 is rotatable relative to the case member 74 about an axis that is along the front-rear direction. A projection portion 69D for reducing a contact area with a bottom face of the cylindrical portion 73A is provided on an upstream face of the universal-joint engaging portion 69. The projection portion 69D may be, for example, provided on the upstream face of the universal-joint engaging portion 69 by forming a cross-shaped rib perpendicularly to the axial direction of the transmission shaft 65 such that the intersection of the rib projects upstream. The projecting height of the cross-shaped rib of the projection portion 69D decreases as the distance from the intersection increases (toward the outer side). Thus, the transmission shaft 65 is coupled also to the boss member 73 with a universal joint (a joint mechanism) to be rotatable/swingable between the cylindrical portion 73A of the boss member 73 and the transmission shaft 65 in every direction perpendicular to one of their axes, and can transmit a torque about the axis of the transmission shaft 65 to the boss member 73. Hence, the transmission shaft 65 is coupled to be tiltable relative to the boss member 73 while transmitting rotation of the transmission shaft 65 that rotates in accordance with the dial control knob 21 to the boss member 73. Provision of the projection portion 69D allows transmitting the torque while reducing frictional resistance between the transmission shaft 65 and the cylindrical portion 73A.

As illustrated in FIG. 3, the annular member 49 is attached to an inner side of the auxiliary fin member 41. The annular member 49 has an annular shape having a laterally-elongated substantially rectangular cross-section and is rotatable on support pivots 41E that are parallel to the upstream fin pivots 41B of the auxiliary fin member 41. The transmission shaft 65 is attached as being inserted in this annular member 49. Vertical sliding movement of the dial control knob 21 is transmitted to the auxiliary fin member 41 via the transmission shaft 65, the annular member 49. The link bar 47 causes the five upstream fins 39 to rotate in synchronization with the auxiliary fin member 41. Thus, the upstream fins 39 and the auxiliary fin member 41 vertically rotate in accordance with the sliding movement of the dial control knob 21. Accordingly, the upstream fin set 17 vertically changes the blow-out direction, in which the air-conditioning air is blown out from the air blow outlet 13A, in accordance with the vertical movement of the dial control knob 21.

(The Damper 19, etc.)

Figure 6:
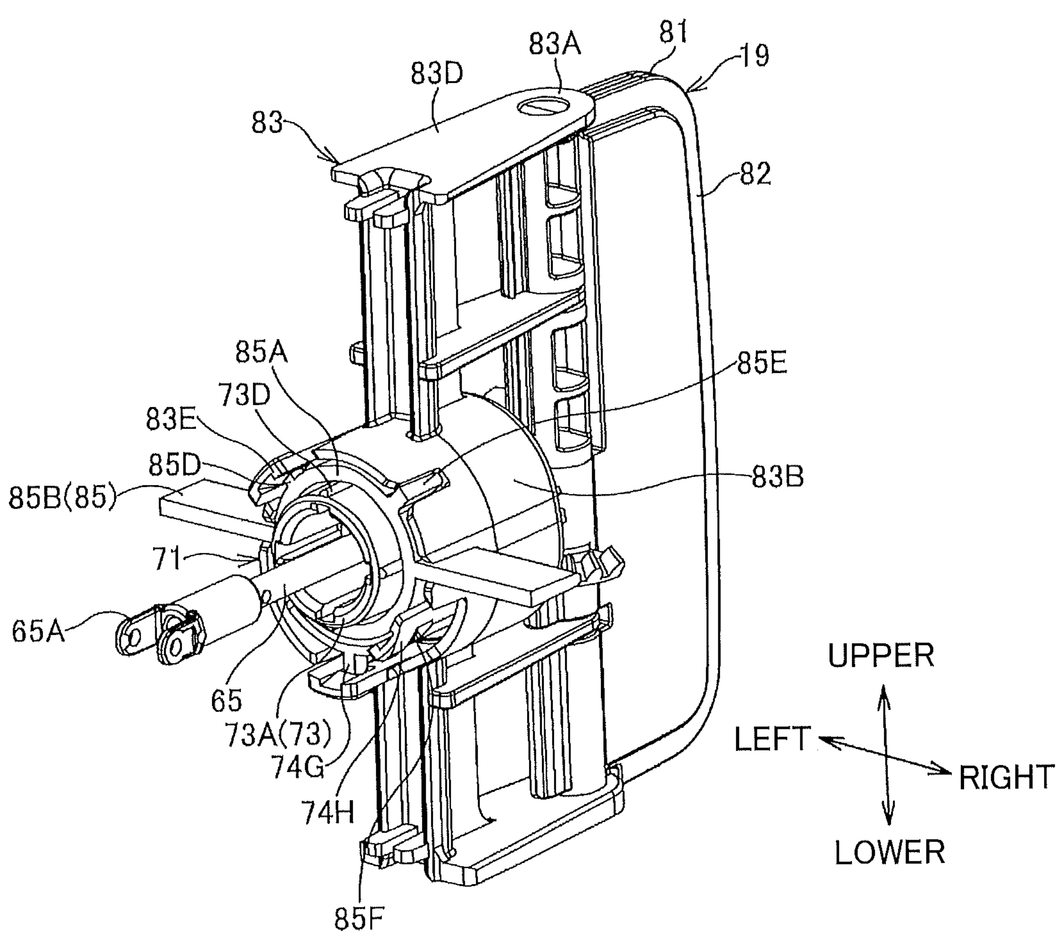
FIG. 6 is a perspective view of a damper support member with members assembled thereto as viewed from downstream.

As illustrated in FIG. 2 and FIG. 4, FIG. 6, the damper 19 includes a first damper plate 81 and a second damper plate 82. The first and second damper plates 81, 82 are flat-plate-shaped and arranged such that their flat surfaces are overlaid on each other in the closed position (see FIG. 2). For example, on the first damper plate 81, a plurality of projections 81D may be formed on a perimeter portion of its flat surface that faces the second damper plate 82 in the closed position. The projections 81D cause the first and second damper plates 81, 82 to make point contact in the closed position.

The damper 19 is pivotally supported by bearing portions 83A of a damper support member 83. The damper 19 is rotatably supported by the damper support member 83 with a damper pivot portion 81A, which has a shape of a protrusion, of the first damper plate 81 inserted into a damper pivot portion 82A, which has a shape of a recess, of the second damper plate 82, and the first and second damper plates 81, 82 are pivotally supported to be pivotable about the same axis. The damper support member 83 is held by a retainer member 85 fixed to the retainer 11. Accordingly, the damper 19 is rotatably held at a predetermined position in the air passage 23 via the retainer member 85 and the damper support member 83.

The retainer member 85 is provided between the upstream fin set 17 and the damper 19 in the air-blowing direction 25. The retainer member 85 includes a body portion 85A and pillar portions 85B, which constitute a pair. The cylindrical portion 73A of the boss member 73 is inserted from upstream into the body portion 85A, which is formed in an annular shape. In the body portion 85A, a through hole tailored to the size of an outer peripheral shape of the cylindrical portion 73A is formed. A plurality of bead portions 73D that are along the axial direction of the cylindrical portion 73A are formed on an outer peripheral surface of the cylindrical portion 73A. The cylindrical portion 73A in a state inserted into the body portion 85A is rotatably held with the bead portions 73D in contact with or slightly spaced from an inner wall of the body portion 85A. Put another way, the through hole that conforms to the sizes of the cylindrical portion 73A and the bead portions 73D is formed in the body portion 85A.

The pillar portions 85B, which constitute a pair, are plate-like shaped to have flat surfaces that are parallel in the lateral direction and the front-rear direction, and connected at their one end to an outer peripheral surface of the body portion 85A and connected at the other ends to an inner wall of the retainer 11. Thus, the body portion 85A is fixed at a predetermined position in the air-blowing direction 25 by the pillar portions 85B, which constitute a pair. The damper support member 83 has a body portion 83B, which is cylindrical, at a center portion in the vertical direction. The bearing portions 83A that support the damper 19 are formed on upstream end portions of four plates 83D fixed to the body portion 83B.

The damper support member 83 is fixed relative to the retainer member 85 with the body portion 85A inserted into the body portion 83B. Claw portions 85D provided on the outer peripheral surface of the body portion 85A are engaged in engaged portions 83E to thus lock the damper support member 83 relative to the retainer member 85. The damper support member 83 is attached to the retainer member 85 with the pillar portions 85B inserted into cutout portions in the body portion 83B. On the outer peripheral surface of the body portion 85A, a positioning member 85E projecting out from the outer peripheral surface is formed. An insertion opening, into which the positioning member 85E is to be inserted, is formed in the damper support member 83. This allows, when attaching the damper support member 83 to the retainer member 85, a user to assemble the damper support member 83 to the retainer member 85 by using the positioning member 85E as a guide, thereby preventing or reducing the occurrence of assembling in the wrong orientation.

Figure 7:
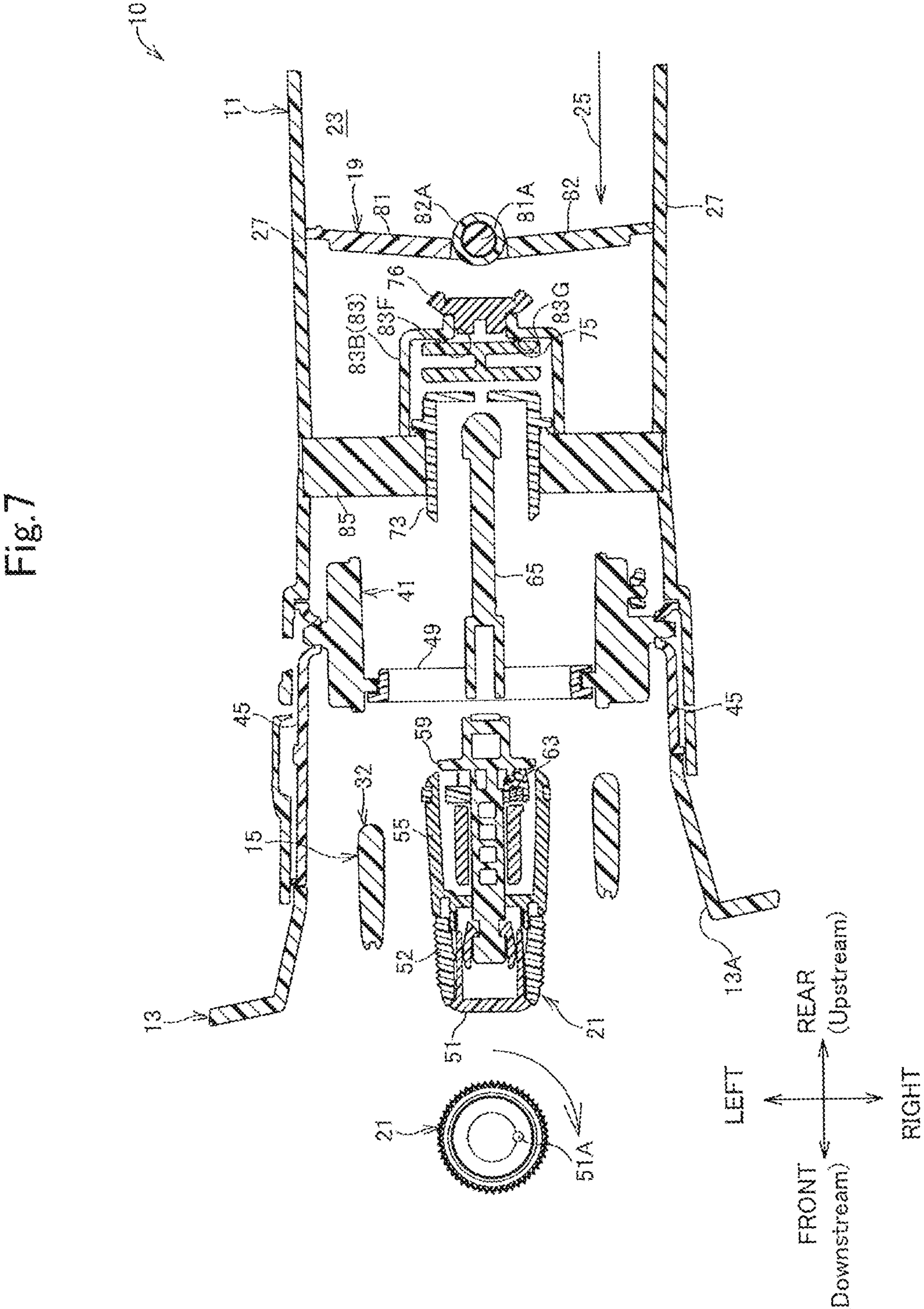
FIG. 7 is a front view of the dial control knob turned 90 degrees and a cross-sectional view illustrating a state where the damper is in its closed position, the views corresponding to FIG. 2.

A damper gear portion 81B is formed at a center portion of a downstream end of the first damper plate 81. A damper gear portion 82B is formed at a center portion of a downstream end of the second damper plate 82. The damper gear portion 81B is formed along an outer peripheral surface of the damper pivot portion 81A in a manner to extend around the first damper plate 81 from its downstream end portion to its left face. The damper gear portion 82B is formed along an outer peripheral surface of the damper pivot portion 82A in a manner to extend around the second damper plate 82 from its downstream end portion to its right face. Accordingly, each of the damper gear portions 81B, 82B is formed on one of the end portions on the damper drive mechanism 71 (a gear member 76) side (downstream, forward) of the first and second damper plates 81, 82. The damper 19 is assembled onto the damper support member 83 with each of the damper gear portions 81B, 82B engaged with the gear member 76 of the damper drive mechanism 71, which will be described later. The damper 19 opens and closes in accordance with rotation of the gear member 76. The first and second damper plates 81, 82 rotate in directions separating from each other (laterally unfolding directions) as the dial control knob 21 is turned from the open position, at which the air passage 23 illustrated in FIG. 2 is open. Rotation of the dial control knob 21 is transmitted to the damper 19 via the transmission shaft 65 and the damper drive mechanism 71. For example, turning the dial control knob 21 by 90 degrees clockwise from the position illustrated in FIG. 2 may bring the first and second damper plates 81, 82 to the closed position illustrated in FIG. 7. Each of the first and second damper plates 81, 82 is laterally unfolded to bring its perimeter edge portion into contact with the inner wall of the retainer 11 to bring the air passage 23 into the shut-off (closed) state.

(The Damper Drive Mechanism 71)

Figure 8:
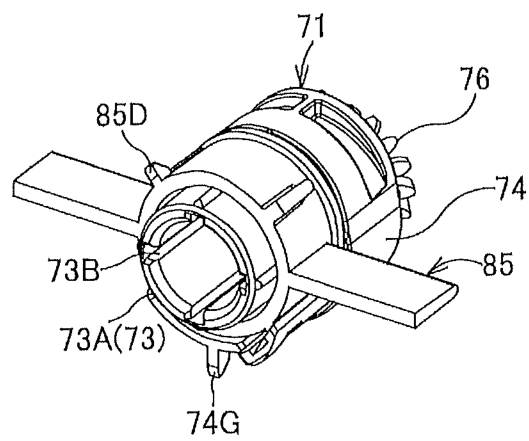
FIG. 8 is a perspective view of a state where a damper drive mechanism is assembled to a retainer member as viewed from downstream.
Figure 9:
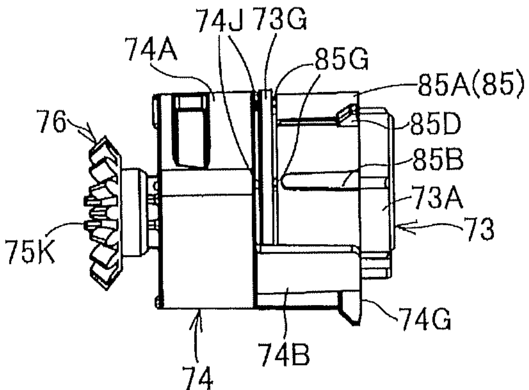
FIG. 9 is a perspective view of the state where the damper drive mechanism is assembled to the retainer member as viewed from the left side.

As illustrated in FIG. 4, the damper drive mechanism 71 includes the boss member 73, a case member 74, and a cam member 75 in this order from downstream. FIG. 8 and FIG. 9 illustrate the damper drive mechanism 71 assembled onto the retainer member 85. The boss member 73 and the retainer member 85 are inserted into the body portion 83B of the damper support member 83 in the state illustrated in FIG. 8 and FIG. 9 from downstream.

Figure 10:
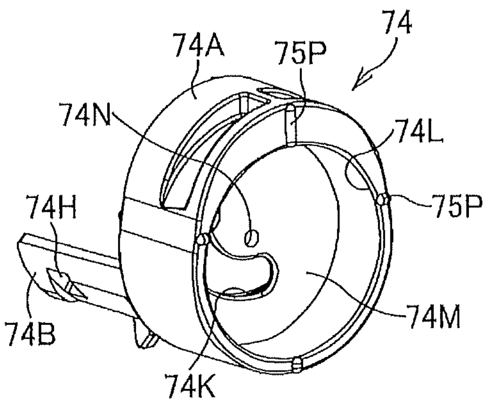
FIG. 10 is a perspective view of a case member as viewed from upstream.
Figure 11:
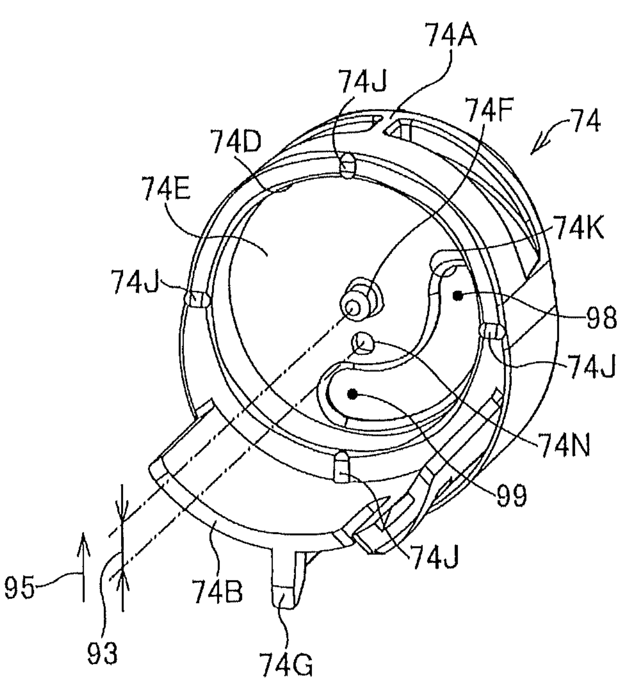
FIG. 11 is a perspective view of the case member as viewed from downstream.
Figure 12:
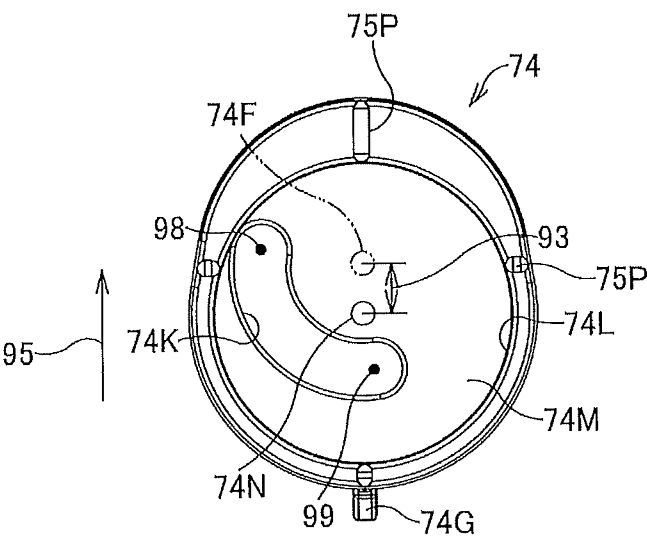
FIG. 12 is a rear view of the case member as viewed from upstream.

As illustrated in FIG. 10 to FIG. 12, the case member 74 includes a body portion 74A and a wall portion 74B. The body portion 74A has a cylindrical shape having a predetermined thickness in the front-rear direction. When viewed from one of the front and rear directions, the body portion 74A has an elliptical shape. A recess-for-boss 74D is formed in a portion, which is facing downstream, of the body portion 74A. The recess-for-boss 74D is formed by recessing upstream along the front-rear direction. A boss pivot 74F that pivotally supports the boss member 73 is provided on a bottom portion 74E of the recess-for-boss 74D. The recess-for-boss 74D is a cylindrical hole that is circular in cross-section taken along a plane perpendicular to an axial direction of the boss pivot 74F. The boss pivot 74F is provided at a center of the bottom portion 74E, which is circular.

Figure 13:
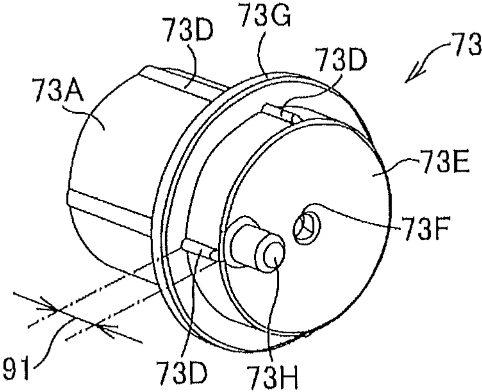
FIG. 13 is a perspective view of a boss member as viewed from upstream.
Figure 14:
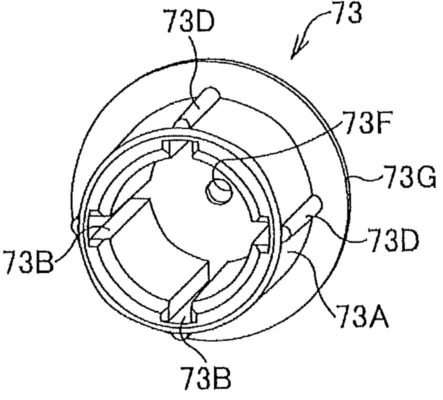
FIG. 14 is a perspective view of the boss member as viewed from downstream.

As illustrated in FIG. 13 and FIG. 14, the boss member 73 includes the cylindrical portion 73A extending in the front-rear direction. A bottom portion 73E of the cylindrical portion 73A is circular. A boss-pivot receiving hole 73F is formed at a center of an upstream face of the bottom portion 73E. The boss-pivot receiving hole 73F extends through the bottom portion 73E in the axial direction of the cylindrical portion 73A, i.e., in the front-rear direction. The boss-pivot receiving hole 73F is circular in cross-section. The boss member 73 is inserted at its end portion including the bottom portion 73E, which is on the upstream side, into the recess-for-boss 74D of the case member 74 with the boss pivot 74F inserted into the boss-pivot receiving hole 73F. The boss member 73 rotates about the boss pivot 74F, which is along the front-rear direction, relative to the case member 74 that is fixed.

As illustrated in FIG. 10 to FIG. 12, the wall portion 74B is an arc-shaped wall formed along an outer peripheral shape of the body portion 74A and projecting downstream (toward the front). On the wall portion 74B, a claw portion 74G to be engaged in an engaging hole in the body portion 83B of the damper support member 83 is formed. The claw portion 74G is engaged in the body portion 83B to thereby positionally fix the case member 74 relative to the damper support member 83 (see FIG. 6). On the wall portion 74B, an engaging hole 74H to be engaged by an engaging claw 85F (see FIG. 6) of the retainer member 85 is also formed. The engaging claw 85F is engaging in the engaging hole 74H to thereby positionally fix the case member 74 relative to the retainer member 85. Thus, the case member 74 is positionally fixed relative to the retainer 11.

As illustrated in FIG. 13 and FIG. 14, a flange portion 73G is formed on the cylindrical portion 73A of the boss member 73. The flange portion 73G is shaped like a disk formed outwardly from the outer peripheral surface of the cylindrical portion 73A in directions perpendicular to the axial direction. The four bead portions 73D described above are individually formed at portions other than the flange portion 73G in the axial direction (at positions to interpose the flange portion 73G therebetween in the front-rear direction). The bead portions 73D downstream from the flange portion 73G are in contact with the inner wall of the body portion 85A of the retainer member 85 to reduce a contact area between the boss member 73 and the retainer member 85. The bead portions 73D upstream from the flange portion 73G are in contact with an inner wall of the recess-for-boss 74D of the case member 74 to reduce a contact area between the boss member 73 and the case member 74. Hence, the boss member 73 can make point contact with the retainer member 85 and the case member 74 so that the boss member 73 can rotate smoothly relative to the retainer member 85 and the case member 74.

The flange portion 73G is formed at a predetermined height 91 from the bottom portion 73E in the axial direction of the cylindrical portion 73A. The flange portion 73G is formed to extend farther outward than the bead portions 73D. As illustrated in FIG. 9, the boss member 73 is attached with the flange portion 73G interposed between the body portion 74A and the body portion 85A in the front-rear direction. A plurality of (e.g., four) bead portions 74J are formed on an end face on the flange portion 73G side of the body portion 74A. The four bead portions 74J are formed on the downstream end face of the body portion 74A at substantially 90-degree spacing (see FIG. 11). A plurality of (e.g., four) bead portions 85G are formed on an end face on the flange portion 73G side of the body portion 85A. The four bead portions 85G are formed on the upstream end face of the body portion 85A at 90-degree spacing. The case member 74 and the retainer member 85 respectively bring the bead portions 74J and 85G into point contact with the flange portion 73G not only in the direction perpendicular to the axial direction but also in the axial direction (the front-rear direction), thereby allowing the boss member 73 to rotate more smoothly relative to the retainer member 85 and the case member 74. Furthermore, inserting the cylindrical portion 73A that is upstream from the flange portion 73G into the recess-for-boss 74D brings the boss member 73 to a state where the bead portions 74J are in contact with an upstream face of the flange portion 73G, or a state where the bead portions 74J are slightly away from the upstream face of the flange portion 73G. Put another way, the height 91 (see FIG. 13), at which the flange portion 73G is formed, is a height that positions the upstream face of the flange portion 73G in contact with the bead portions 74J or slightly away from the bead portions 74J when the cylindrical portion 73A is inserted into the recess-for-boss 74D.

As illustrated in FIG. 10 to FIG. 12, an insertion hole 74K is formed in the bottom portion 74E. The insertion hole 74K may be, for example, formed to have an arcuate shape about the boss pivot 74F with a predetermined radius and a predetermined angular range along an edge portion (the inner wall of the recess-for-boss 74D) of the bottom portion 74E. The predetermined angular range where the insertion hole 74K is formed may be, for example, approximately 120 degrees to approximately 150 degrees. As illustrated in FIG. 13, a boss pin 73H is formed on the upstream face of the bottom portion 73E. For example, the boss pin 73H may have a cylindrical shape with an outer diameter larger (thicker) than an inner diameter of the boss-pivot receiving hole 73F and be formed along the direction perpendicular to a flat surface of the bottom portion 73E, i.e., the axial direction of the cylindrical portion 73A. For example, the boss pin 73H may be formed on an edge portion of the upstream face of the bottom portion 73E, which is circular. With the boss member 73 attached to the case member 74, this boss pin 73H is inserted into the insertion hole 74K to let a distal end project out upstream from the insertion hole 74K. The insertion hole 74K has a groove width only slightly larger than the outer diameter of the boss pin 73H. The boss pin 73H moves in the insertion hole 74K in accordance with an operation of turning the dial control knob 21.

As illustrated in FIG. 10 to FIG. 12, a recess-for-cam 74L is formed in a portion, which is facing upstream, of the body portion 74A. The recess-for-cam 74L is formed by recessing downstream along the front-rear direction. A camshaft receiving hole 74N that pivotally supports the cam member 75 is formed in a bottom portion 74M of the recess-for-cam 74L. The bottom portion 74M is formed on a rear face of the bottom portion 74E, which is on the downstream side. The bottom portion 74M is a cylindrical hole that is circular in cross-section taken along a plane perpendicular to the front-rear direction. The camshaft receiving hole 74N is provided at a center of the bottom portion 74M, which is circular, extends through the bottom portion 74M, and is in communication with the bottom portion 74M, which is on the upstream side, and the bottom portion 74E, which is on the downstream side.

The recess-for-cam 74L, which is on the upstream side, and the recess-for-boss 74D, which is on the downstream side, are provided at positions offset in the front-rear direction, i.e., in the direction perpendicular to the axial direction of the boss pivot 74F. For example, the camshaft receiving hole 74N may be provided at a position offset from the boss pivot 74F by an offset amount 93 in the vertical direction (hereinafter, sometimes referred to as an offset direction 95) in FIG. 12. The offset amount 93 may be 3 mm, for example. Accordingly, the bottom portion 74E, which is circular, is at a position offset from the bottom portion 74M by the offset amount 93 in the offset direction 95. The camshaft receiving hole 74N is at a position offset from the center of the bottom portion 74E, i.e., the boss pivot 74F, by the offset amount 93. Inversely, the boss pivot 74F is at a position offset from the center of the bottom portion 74M, i.e., the camshaft receiving hole 74N, by the offset amount 93. Accordingly, when the body portion 74A is viewed from one of the front and rear directions, the body portion 74A is shaped like an oval that is wide in the offset direction 95. The cam member 75 of the present embodiment is configured to rotate about the axis eccentric from the boss member 73.

The insertion hole 74K is, in the offset direction 95, formed from a position on the opposite side of the boss pivot 74F with respect to the camshaft receiving hole 74N to a position only slightly higher than the boss pivot 74F in the offset direction 95 (a position away from the camshaft receiving hole 74N in the offset direction 95) along an outer periphery of the bottom portion 74E. The wall portion 74B is provided on an end portion on the opposite side of the boss pivot 74F with respect to the camshaft receiving hole 74N in the offset direction 95. One of the bead portions 74J described above is formed at a circumferential center, on an inner periphery side, of the wall portion 74B (see FIG. 11).

As illustrated in FIG. 15 to FIG. 18, the cam member 75 is shaped like a disk having a predetermined thickness in the front-rear direction and includes a camshaft 75B on a downstream face 75A. The camshaft 75B is formed at a center of the downstream face 75A, which is circular, and projects in the direction perpendicular to the downstream face 75A. The cam member 75 is stored in the recess-for-cam 74L with the camshaft 75B inserted in the camshaft receiving hole 74N of the case member 74. The cam member 75 is stored in a portion surrounded by the case member 74 and the body portion 83B of the damper support member 83 in an axial direction of the camshaft 75B (see FIG. 2, FIG. 7). The cam member 75 is stored in the recess-for-cam 74L in a state rotatable about the camshaft 75B.

A cam insertion portion 75D, into which the boss pin 73H of the boss member 73 is to be inserted, is formed in the downstream face 75A. The cam insertion portion 75D includes a first insertion portion 75E, a second insertion portion 75F, and a connecting portion 75G that connects the first and second insertion portions 75E, 75F. The first insertion portion 75E is a portion in which the boss pin 73H is to be inserted in a state where the damper 19 is in the open position (see FIG. 2). The second insertion portion 75F is a portion in which the boss pin 73H is to be inserted in a state where the damper 19 is in the closed position (see FIG. 7). The cam insertion portion 75D is substantially shaped in the letter L that is bent at the connecting portion 75G in plan view of the downstream face 75A.

A corner portion 75H, which is bent, of the connecting portion 75G is provided on the opposite side of the second insertion portion 75F with respect to a straight line 97 connecting the camshaft 75B and the first insertion portion 75E. The first insertion portion 75E is formed at an outer peripheral end of the downstream face 75A. On a path from the first insertion portion 75E to the corner portion 75H, the connecting portion 75G is formed such that it is tilted more toward the corner portion 75H than the straight line 97 (the radial direction) and directed to approach the camshaft 75B. On the path from the corner portion 75H to the second insertion portion 75F, the cam insertion portion 75D is formed in a direction intersecting the straight line 97. The second insertion portion 75F is positioned in proximity to the camshaft 75B.

Into the cam insertion portion 75D of the cam member 75, a distal end of the boss pin 73H projecting upstream via the insertion hole 74K of the case member 74 is inserted. As described above, the boss pin 73H moves in the insertion hole 74K in accordance with an operation of turning the dial control knob 21. For example, the boss pin 73H may move from a first insertion position 98 toward a second insertion position 99 illustrated in FIG. 11. The first insertion position 98 is a position where the boss pin 73H is to be inserted when, for example, the damper 19 is in the open position, and is a position on the boss pivot 74F side in the insertion hole 74K in the offset direction 95. The second insertion position 99 is a position where the boss pin 73H is to be inserted when the damper 19 is in the closed position, and is a position on the opposite side of the boss pivot 74F with respect to the camshaft receiving hole 74N in the offset direction 95. When the boss pin 73H moves from the first insertion position 98 toward the second insertion position 99 in the insertion hole 74K in accordance with rotation of the dial control knob 21, the boss pin 73H is engaged in the cam insertion portion 75D, whereby the cam member 75 is rotated. The boss pin 73H moves from the first insertion portion 75E via the connecting portion 75G to the second insertion portion 75F while moving in the insertion hole 74K. When placed at the second insertion position 99, the boss pin 73H is inserted into the second insertion portion 75F.

Figure 15:
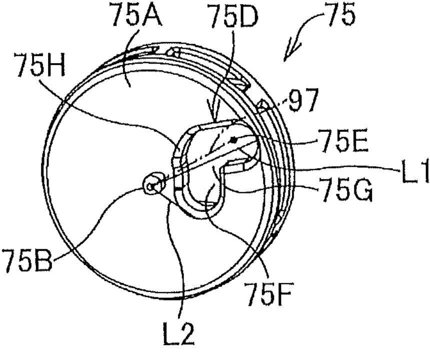
FIG. 15 is a perspective view of a cam member as viewed from downstream.
Figure 16:
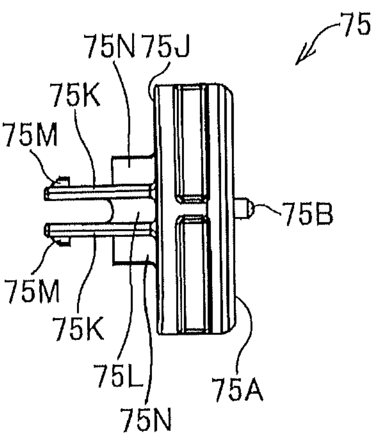
FIG. 16 is a side view of the cam member.
Figure 17:
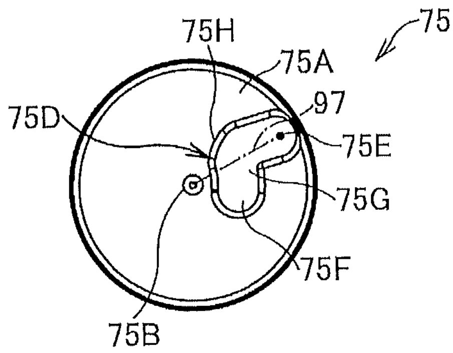
FIG. 17 is a front view of the cam member as viewed from downstream.
Figure 18:
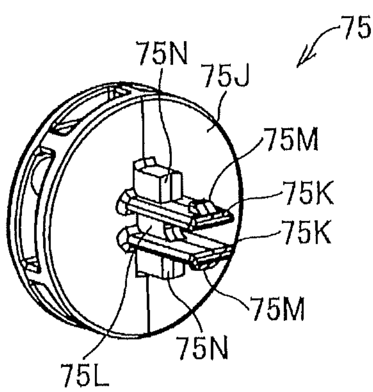
FIG. 18 is a perspective view of the cam member as viewed from upstream.

As illustrated in FIG. 15, in plan view of the cam member 75, a first distance L1 between the first insertion portion 75E and the camshaft 75B is longer than a second distance L2 between the second insertion portion 75F and the camshaft 75B. More specifically, the first insertion portion 75E is formed partly along a circular outer periphery of the cam member 75. The second insertion portion 75F is formed at a position in proximity to the camshaft 75B. The first distance L1 may be, for example, a distance between an outer peripheral end portion of the first insertion portion 75E (portion corresponding to an outer peripheral end portion of the downstream face 75A) and the camshaft 75B. The second distance L2 may be, for example, a distance between an end portion of the second insertion portion 75F in the moving direction of the boss pin 73H (end portion most distant from the connecting portion 75G) and the camshaft 75B. In this case, the first and second distances L1, L2 are the distances between the camshaft 75B and each of the opposite ends of the cam insertion portion 75D, and the first distance L1 is longer than the second distance L2.

The gear member 76 is provided upstream of the cam member 75. A single pair of gear engaging portions 75K is formed on an upstream face 75J of the cam member 75. Each of the single pair of gear engaging portions 75K has a shape of a substantially rectangular plate extending in a direction perpendicular to the plane of the upstream face 75J. The single pair of gear engaging portions 75K is installed upright on the upstream face 75J such that its planes are parallel to each other. The single pair of gear engaging portions 75K is coupled to each other at basal end portions with a base portion 75L. The single pair of gear engaging portions 75K is inserted into the gear member 76.

Figure 19:
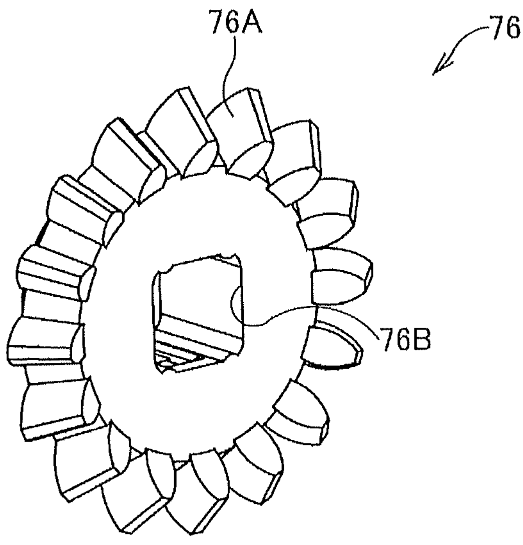
FIG. 19 is a perspective view of a gear member as viewed from upstream.
Figure 20:
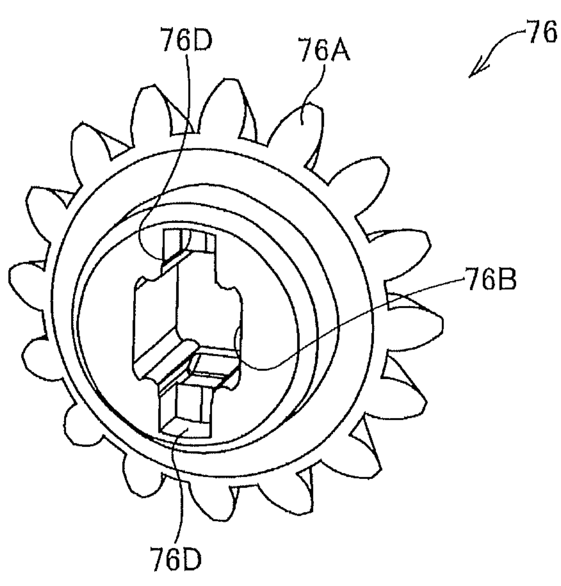
FIG. 20 is a perspective view of the gear member as viewed from downstream.

As illustrated in FIG. 19 and FIG. 20, the gear member 76 are substantially disk-like, and tooth portions 76A formed along an outer periphery of the gear member 76 at predetermined spacing. The tooth portions 76A are shaped to tilt upstream. Accordingly, the gear member 76 meshes with each of the damper gear portions 81B, 82B of the damper 19 to transmit the torque in a meshed state-so-called bevel-gear-like meshed state-in which they mesh with their rotation axes oriented perpendicular to each other (with the rotation axis of the gear member 76 and the rotation axis of the damper 19 intersecting at a right angle). A gear insertion hole 76B, into which the single pair of gear engaging portions 75K is to be inserted, is formed at a center of the gear member 76 therethrough. A claw portion 75M is formed an each of distal end portions of the single pair of gear engaging portions 75K. The gear member 76 is mounted by causing the distal end portions of the single pair of gear engaging portions 75K to project out of the gear insertion hole 76B upstream and engaging the claw portions 75M on the peripheral edge portion of the gear insertion hole 76B (see FIG. 9).

Gear engaging portions 75N having a substantially rectangular parallelepiped shape are formed outside, in a direction in which they face each other, the basal end portions of the single pair of gear engaging portions 75K. On the downstream side of the gear insertion hole 76B, a single pair of recesses 76D is recessed to conform to the shape of the gear engaging portions 75N, which constitute a pair. The cam member 75 inserts the gear engaging portions 75N, which constitute a pair, into the single pair of recesses 76D individually while inserting the single pair of gear engaging portions 75K into the gear insertion hole 76B. This allows efficiently transmitting rotation of the cam member 75 to the gear member 76. In addition, ease of assembly can be increased by indicating the rotational position with the gear engaging portions 75N when attaching the gear member 76 to the cam member 75.

As illustrated in FIG. 2, the gear member 76 is attached with its portion on the downstream side inserted into a through hole 83F provided in a bottom portion of the body portion 83B of the damper support member 83. Bead portions 83G are formed on a downstream face of the bottom portion of the body portion 83B in an annular shape in a manner to surround an opening of the through hole 83F. As illustrated in FIG. 10 and FIG. 12, a plurality of (e.g., four) bead portions 75P is formed on an upstream face of the case member 74. The case member 74 is reduced in contact area by making point contact with the bottom portion of the body portion 83B at the bead portions 83G, 75P, to be held smoothly rotatably relative to the damper support member 83.

(Opening and Closing Operations of the Damper 19)

Figure 21:
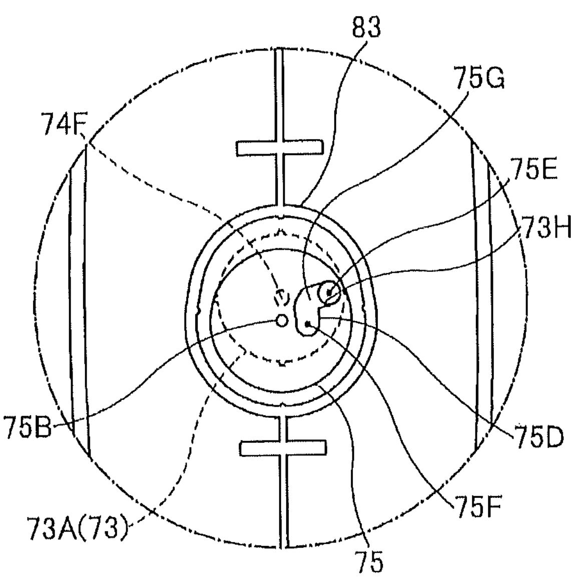
FIG. 21 is a schematic view illustrating a section taken along the line B-B illustrated in FIG. 2, the view illustrating a state where the dial control knob is in an open position.
Figure 22:
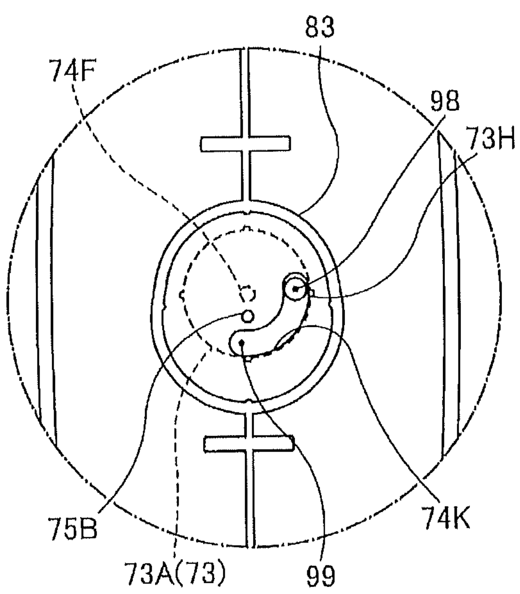
FIG. 22 is a cross-sectional view taken along the line C-C illustrated in FIG. 2, the view illustrating the state where the dial control knob is in the open position.

Next, opening and closing operations of the damper 19 are described. FIG. 21 presents a cross-sectional view taken along the line B-B illustrated in FIG. 2, and FIG. 22 presents a cross-section taken along the line C-C. To indicate a relative positional relationship between members, the cylindrical portion 73A is presented by dashed lines in FIG. 21. FIG. 21 and FIG. 22 illustrate a state where the dial control knob 21 is at the position where the damper 19 is open. In this state, for example, the position mark 51A of the dial control knob 21 may be atop (at 12 o'clock position) as illustrated in FIG. 1 and FIG. 2. Turning the dial control knob 21 clockwise from the position illustrated in FIG. 1 gradually tilts the damper 19, causing the damper 19 to close the air passage 23. For example, when the position mark 51A is rotated by 90 degrees clockwise from the state illustrated in FIG. 1, the damper 19 is brought to the closed position where the air passage 23 is completely closed illustrated in FIG. 7.

Figure 23:
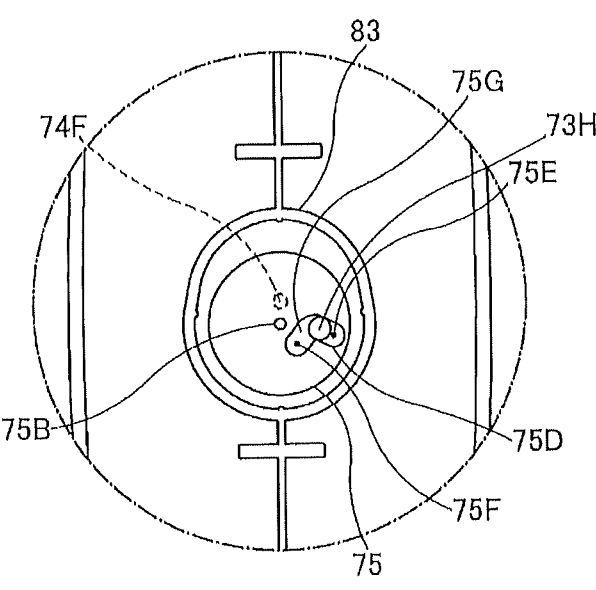
FIG. 23 is a diagram illustrating a state where the transmission shaft is rotated by 40 degrees from the state illustrated in FIG. 21.
Figure 24:
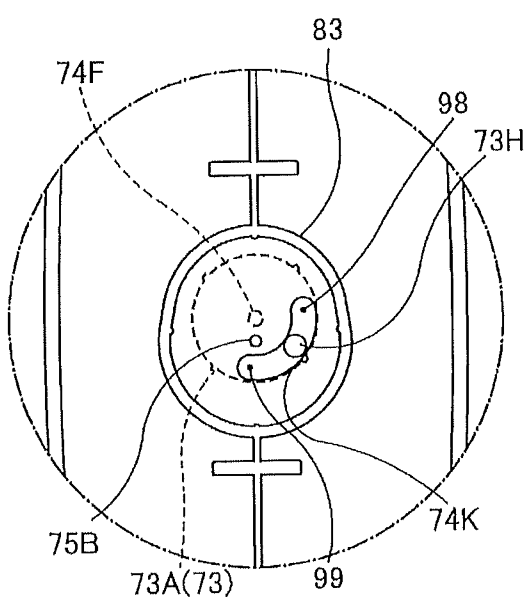
FIG. 24 is a diagram illustrating the state where the transmission shaft is rotated by 40 degrees from the state illustrated in FIG. 22.

When performing an operation to close the damper 19, a user turns the dial control knob 21 clockwise. FIG. 23 and FIG. 24 illustrate a state where the transmission shaft 65 is rotated by 40 degrees from the position illustrated in each of FIG. 21 and FIG. 22 via the dial control knob 21. As illustrated in FIG. 23, FIG. 24, the boss pin 73H moves from the first insertion position 98 toward the second insertion position 99 along the arcuate shape of the insertion hole 74K. In addition, because of being inserted also in the cam insertion portion 75D, the boss pin 73H engages in the cam insertion portion 75D and rotates the cam member 75. Since the boss pivot 74F is provided at the position offset from the camshaft 75B as described above, the cam member 75 rotates about the camshaft 75B at the position eccentric from the boss pivot 74F of the boss member 73. The differences in the rotation center, radius of rotation, and trajectory of rotation, cause the boss pin 73H to move from the first insertion portion 75E to the connecting portion 75G while engaging in the insertion hole 74K and the cam insertion portion 75D.

Figure 25:
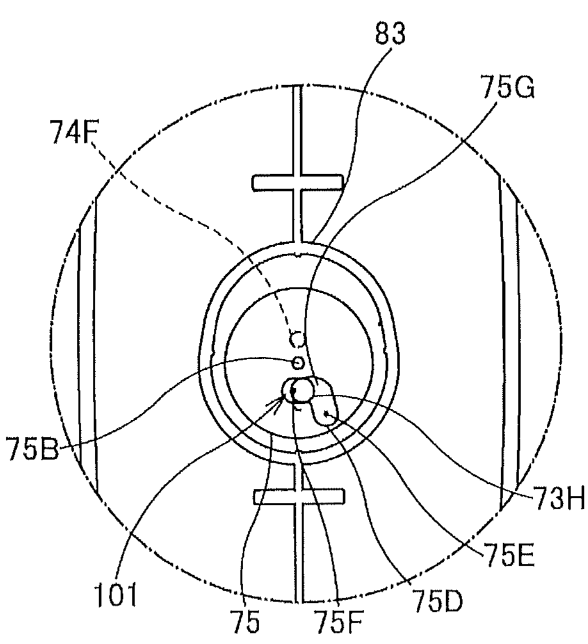
FIG. 25 is a diagram illustrating a state where the transmission shaft is rotated by 90 degrees from the state illustrated in FIG. 21.
Figure 26:
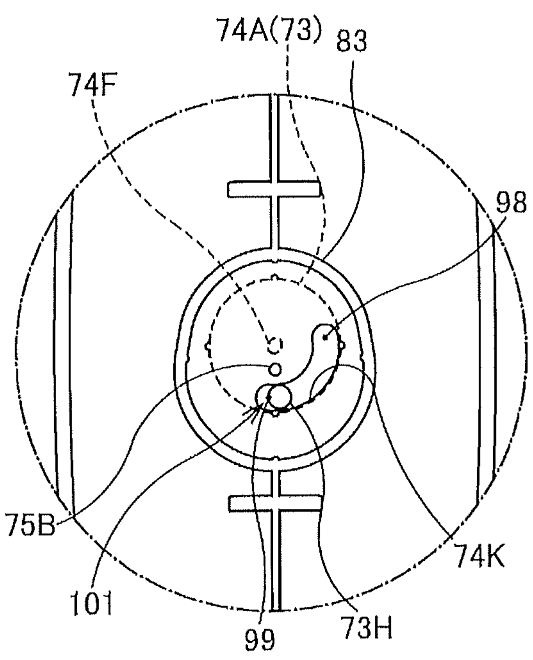
FIG. 26 is a diagram illustrating the state where the transmission shaft is rotated by 90 degrees from the state illustrated in FIG. 22.

FIG. 25 and FIG. 26 illustrate a state where the transmission shaft 65 is rotated by 90 degrees from the position illustrated in each of FIG. 21, FIG. 22. As illustrated in FIG. 25, FIG. 26, the boss pin 73H moves in the insertion hole 74K to reach the second insertion position 99. The boss pin 73H moves in the insertion hole 74K to move from the first insertion portion 75E to the second insertion portion 75F. The cam insertion portion 75D rotates to the second insertion position 99 where the second insertion portion 75F positionally coincides with the second insertion position 99 in the front-rear direction. When the cam insertion portion 75D reaches the position illustrated in FIG. 25, the cam member 75 rotates the damper 19 via the gear member 76 to the closed position. The air passage 23 is closed by the first and second damper plates 81, 82 (see FIG. 7). The boss pin 73H is brought to a state where it has a clearance in the insertion hole 74K from an end portion on the second insertion position 99 side. The boss pin 73H is brought to a state where it has a clearance in the cam insertion portion 75D from an end portion on the second insertion portion 75F side.

Figure 27:
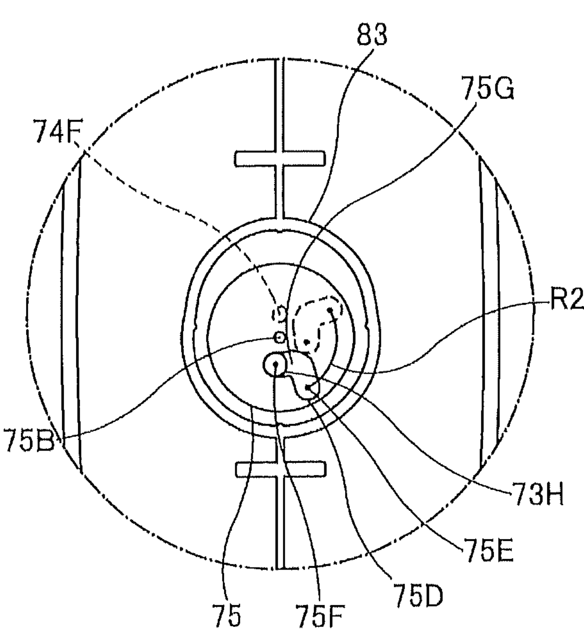
FIG. 27 is a diagram illustrating a state where the transmission shaft is rotated by 100 degrees from the state illustrated in FIG. 21.
Figure 28:
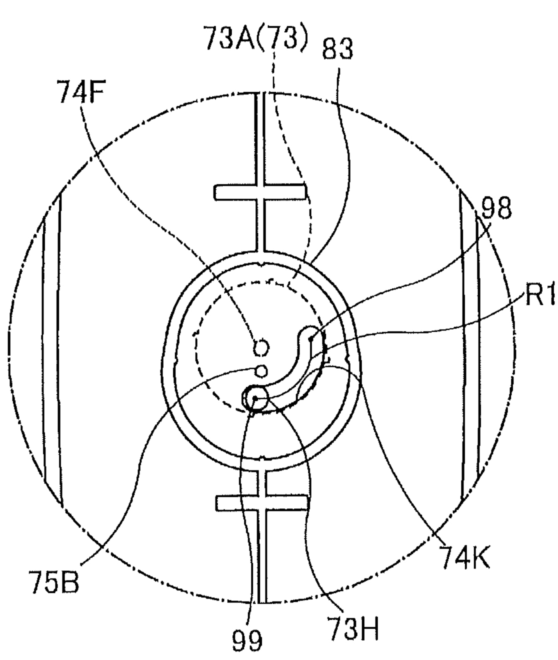
FIG. 28 is a diagram illustrating the state where the transmission shaft is rotated by 100 degrees from the state illustrated in FIG. 22.

FIG. 27 and FIG. 28 illustrate a state where the transmission shaft 65 is rotated by 100 degrees from the position illustrated in each of FIG. 21, FIG. 22. As illustrated in FIG. 27, FIG. 28, the boss pin 73H travels in the insertion hole 74K only 10 degrees clockwise. In the insertion hole 74K, the boss pin 73H is brought to a position in contact with or in proximity of the end portion on the second insertion position 99 side. The boss pin 73H further travels in the cam insertion portion 75D toward the end portion on the second insertion portion 75F side. However, the cam insertion portion 75D does not rotate from the closed position for the damper 19 illustrated in FIG. 25 (is not changed in orientation). In other words, the cam member 75 does not rotate. In FIG. 25, FIG. 26 to FIG. 27, and FIG. 28, the area through which the boss pin 73H has traveled in the insertion hole 74K or in the cam insertion portion 75D functions as an extra area 101 where no torque is applied to the cam member 75 (to let it idle run) (see FIG. 25, FIG. 26). Put another way, in the cam insertion portion 75D, the extra area 101 is provided on the second insertion portion 75F side so that the boss pin 73H can further move in the cam insertion portion 75D from the state where the cam member 75 is arranged at the closed position for the damper 19. Similarly, in the insertion hole 74K, the extra area 101 is provided on the second insertion position 99 side so that the boss pin 73H can further move in the insertion hole 74K from the state where the cam member 75 is arranged at the closed positions for the damper 19. This allows the boss pin 73H to travel in the insertion hole 74K and in the cam insertion portion 75D without rotating the cam member 75.

Meanwhile, in the register 10 of the present embodiment, the transmission shaft 65 is connected with the joint mechanisms to transmit rotation of the dial control knob 21. With such a configuration, when the intersecting angle between the axes of the dial control knob 21 and the transmission shaft 65 or the intersecting angle between the axes of the transmission shaft 65 and the damper drive mechanism 71 (the boss member 73) increases, rotational misalignment that develops between the dial control knob 21 and the boss member 73 may increase. For example, the dial control knob 21 may be operated to move the downstream fin set 15 to the left until it no longer moves and move the upstream fin set 17 upward until it no longer moves. When the fins are rotated to such limit positions of their movable range, even when the dial control knob 21 is turned by 90 degrees, the angle the boss member 73 rotates may be less than 90 degrees, and the insufficient rotation amount may cause the cam member 75 to fail to rotate to the closed position, resulting in failure to close the damper 19. With another configuration of the register 10, contrastingly, when the intersecting angle between the axes of the dial control knob 21 and the transmission shaft 65 or the intersecting angle between the axes of the transmission shaft 65 and the boss member 73 increases, even if the dial control knob 21 is turned 90 degrees, the boss member 73 may rotate more than 90 degrees as illustrated in FIG. 27, FIG. 28. In other words, it may rotate excessively. In this case, the damper 19 may contact or interfere with the inner wall of the retainer 11 more than necessary and cause abnormal noise.

On the other hand, the register 10 of the present embodiment allows, by causing the cam member 75 to rotate about the axis eccentric relative to the boss member 73, adjusting the difference in rotation amount of the two members. The configuration of the present example allows making a rotation radius R2 of movement (rotation) of the cam insertion portion 75D in accordance with rotation of the dial control knob 21 larger than a rotation radius R1 of movement (rotation) of the boss pin 73H as illustrated in FIG. 27, FIG. 28. In other words, it is possible to cause the cam member 75 to rotate more than the boss member 73. The difference between the rotation radii R1 and R2 may be changed by, for example, adjusting the shapes of the insertion hole 74K and the cam insertion portion 75D, positions where they are formed, the offset amount 93 between the boss pivot 74F and the camshaft 75B, the positional relationship between the boss pin 73H and the camshaft 75B, or the like. Accordingly, making the rotation radius R2 of movement (rotation) of the cam insertion portion 75D in accordance with rotation of the dial control knob 21 smaller than the rotation radius R1 of movement (rotation) of the boss pin 73H is also possible by adjusting the positional relationship between the boss pin 73H and the camshaft 75B or the like. In other words, it is possible to cause the cam member 75 to rotate less than the boss member 73. This eliminates insufficient or excessive rotation of the cam member 75 so that the damper 19 can be appropriately closed.

Provision of the extra area 101 described above allows, even when the intersecting angle increases and the rotation angle of the boss member 73 exceeds 90 degrees, letting the boss pin 73H to idle run, thereby absorbing the extra rotation amount. Put another way, provision of the extra area 101 described above allows setting an angle of more than 90 degrees as a maximum allowable rotation amount of the boss member 73. This also eliminates insufficient rotation of the cam member 75 so that the damper 19 can be closed more reliably. In the above description, although only the operation of closing the damper 19 is described, with regard to the operation of turning the dial control knob 21 in the direction to open the air passage 23, insufficient or excessive rotation can be eliminated similarly.

In the above embodiment, the downstream fin set 15 and the upstream fin set 17 are an example of the fins. The dial control knob 21 is an example of the control knob. The boss pin 73H is an example of the boss projection. The recess-for-cam 74L is an example of the first recess. The recess-for-boss 74D is an example of the second recess. The retainer member 85 is an example of the mounting portion. The bead portions 85G are an example of the retainer bead portions. The bead portions 74J are an example of the cover bead portions. The damper gear portion 81B is an example of the first damper teeth portion. The damper gear portion 82B is an example of the second damper teeth portion. The tooth portions 76A are an example of the cam tooth portions.

According to the embodiment described above, the following effects are exerted.

(1) In the register 10 of the present embodiment, coupling between the transmission shaft 65 and the dial control knob 21 and coupling between the transmission shaft 65 and the boss member 73 are each made with a joint mechanism (for example, a universal joint). The case member 74 holds the camshaft 75B at a position offset from the straight line that is along the axial direction of the boss pivot 74F in the direction (the offset direction 95) perpendicular to the axial direction of the boss pivot 74F to rotate the cam member 75 about the camshaft 75B that is eccentric in accordance with the rotation of the boss member 73. According to this, when the dial control knob 21 is turned, its rotation is transmitted to the boss member 73 of the damper drive mechanism 71 via the joint mechanisms. The cam member 75, in which the boss pin 73H of the boss member 73 is inserted, rotates about the camshaft 75B as the boss member 73 rotates. As the cam member 75 rotates, it tilts the damper drive mechanism 71 between the open position and the closed position.

If it is assumed that the camshaft 75B is arranged on the axis of the boss pivot 74F and the cam member 75 rotates coaxially with the boss member 73, in a state where, for example, the intersecting angle between the axes of the dial control knob 21 and the transmission shaft 65 is large, rotational misalignment that develops between the dial control knob 21 and the cam member 75 is large. By contrast, the case member 74 holds the camshaft 75B at the position offset from the boss pivot 74F to rotate the cam member 75 at the eccentric position in accordance with rotation of the boss member 73. The cam member 75 rotates about the camshaft 75B in an eccentric positional relationship relative to the boss member 73 and rotates in conjunction with the boss member 73. Such a configuration allows changing the difference between the rotation radii R1 and R2 by, for example, adjusting the shape of the insertion hole 74K or the cam insertion portion 75D, or the offset amount 93. Accordingly, a swing amount of the damper 19 can be adjusted, and excessive or insufficient tilting of the damper 19 can be eliminated.

(2) The boss pin 73H moves, as the boss member 73 rotates about the boss pivot 74F, in the cam insertion portion 75D while being engaged in the cam insertion portion 75D and simultaneously moves in the insertion hole 74K. Configuring the boss pin 73H to be movable relative to both the case member 74 and the cam member 75 allows preventing against making contact with both the case member 74 and the cam member 75 to thereby be restricted in movement. Accordingly, the boss member 73 and the cam member 75 that rotate eccentrically can transmit the rotation of the boss member 73 to the cam member 75 smoothly.

(3) The insertion hole 74K has a shape of an arc cut out about the boss pivot 74F. The camshaft 75B is provided between the insertion hole 74K and the boss pivot 74F when viewed from the axial direction of the camshaft 75B. According to this, the cam insertion portion 75D (the cam member 75) can be rotated about the camshaft 75B arranged between the insertion hole 74K and the boss pivot 74F. The cam insertion portion 75D can be rotated in such an arcuate trajectory that conforms to the shape of the insertion hole 74K.

(4) The cam insertion portion 75D includes the first insertion portion 75E, into which the boss pin 73H is to be inserted when the damper 19 is in the open position, and the second insertion portion 75F, into which the boss pin 73H is to be inserted when the damper 19 is in the closed position. The first distance L1 between the first insertion portion 75E and the camshaft 75B is longer than the second distance L2 between the second insertion portion 75F and the camshaft 75B (see FIG. 15). According to this, the second insertion portion 75F can be arranged at a position closer to the camshaft 75B, which allows arranging the boss pin 73H at a position closer to the camshaft 75B when the damper 19 is in the closed position.

(5) The cam insertion portion 75D includes the connecting portion 75G that connects the first insertion portion 75E and the second insertion portion 75F and has the shape bent at the connecting portion 75G. The corner portion 75H, which is bent, of the connecting portion 75G is provided on the opposite side of the second insertion portion 75F with respect to the straight line 97 connecting the camshaft 75B and the first insertion portion 75E (see FIG. 15). According to this, when the damper 19 is being closed, a traveling direction of the boss pin 73H can be shifted toward the second insertion portion 75F at the corner portion 75H, which is bent, while causing the boss pin 73H to approach the camshaft 75B. By inserting the boss pin 73H in the second insertion portion 75F ahead of the bent in the traveling direction, it is possible to prevent the boss pin 73H from moving toward the first insertion portion 75E when the dial control knob 21 is not operated or, in other words, prevent the damper 19 that is once closed from opening by itself. It is also possible to prevent the damper 19 that is once open from closing by itself by inserting the boss pin 73H in the first insertion portion 75E at the open position.

(6) In the cam insertion portion 75D, the extra area 101, into which the boss pin 73H is to be inserted when the dial control knob 21 is further rotated after the damper 19 has reached the closed position (the position where it contacts the register 10 to be restricted in movement), is formed at an end portion of a traveling route, through which the boss pin 73H travels when the damper 19 tilts between the open position and the closed position, the end portion being on the closed position side. According to this, when the downstream fin set 15 or the upstream fin set 17 is swung to a predetermined position, if the transmission shaft 65 (the boss member 73) rotates more 90 degrees due to mismatch between intersecting angles, the boss pin 73H can be inserted into the extra area 101 to cause the boss pin 73H to idle. Occurrence of excessive interference between the damper 19 and the retainer 11 and abnormal noise can be prevented or reduced.

(7) The case member 74 includes the recess-for-cam 74L that stores the cam member 75 and is circular in cross-section and the recess-for-boss 74D that stores the bottom portion 73E of the boss member 73 and is circular in cross-section. The bottom portion 74M of the recess-for-cam 74L is formed at the position offset from the bottom portion 74E of the recess-for-boss 74D along the direction connecting the camshaft 75B and the boss pivot 74F (the offset direction 95) as viewed from the axial direction of the camshaft 75B. According to this, the recess-for-cam 74L and the recess-for-boss 74D are arranged in the offset direction 95, in which the camshaft 75B and the boss pivot 74F are offset, and can store the cam member 75 and the boss member 73, respectively. The overall size of the case member 74 can be minimized to have, for example, an oval outer shape as a whole.

(8) In the retainer 11, the boss member 73 is mounted on the retainer member 85. The boss member 73 includes the flange portion 73G interposed between the retainer member 85 and the case member 74 in the axial direction of the boss pivot 74F. The retainer member 85 includes the plurality of bead portions 85G projecting toward the flange portion 73G. The case member 74 includes the plurality of bead portions 74J projecting toward the flange portion 73G. The boss member 73 is pinched at the flange portion 73G by the bead portions 74J, 85G from opposite sides of the axial direction to be rotatably supported relative to the retainer member 85 and the case member 74. This allows reducing the contact area between the retainer member 85 and the boss member 73, and between the case member 74 and the boss member 73. The boss member 73 can be rotated smoothly relative to the retainer member 85 and the case member 74.

(9) The damper 19 includes the first damper plate 81 that includes the damper gear portion 81B and the second damper plate 82 that includes the damper gear portion 82B. The cam member 75 includes the gear member 76 that closes the air passage 23 by meshing with both the damper gear portions 81B and 82B to tilt both the first and second damper plates 81, 82 in the directions separating from each other. The gear member 76 includes the tooth portions 76A along the circular outer periphery to rotate about the straight line that is along the axial direction of the camshaft 75B as the cam member 75 rotates. The damper gear portion 81B meshes with the tooth portions 76A in the state of being supported rotatably about the damper pivot portions 81A, 82A that are along the direction (in the present embodiment, the vertical direction) perpendicular to the axial direction of the camshaft 75B. The damper gear portion 82B meshes with the tooth portions 76A in the state of being supported rotatably about the damper pivot portions 81A, 82A and is provided on the opposite side of the damper gear portion 81B with respect to the gear member 76 in the direction (in the present embodiment, the vertical direction) that is along the damper pivot portions 81A, 82A. The damper gear portions 81B, 82B are respectively formed at end portions on the gear member 76 side (downstream, front) of the first and second damper plates 81, 82. According to this, by providing the damper gear portions 81B, 82B respectively on the end portions of the first and second damper plates 81, 82, the need for providing members or the like on flat plate portions of the first and second damper plates 81, 82 for coupling with the damper drive mechanism 71 is eliminated. This eliminates the need for forming holes or the like, which was necessary for conventional coupling mechanisms, for arranging coupling mechanisms (such as engaging arms and grooves) in coupling portions of the first and second damper plates 81, 82. Leakage of the air conditioning air through gaps in coupling portions of the damper 19, which might otherwise occur when the first and second damper plates 81, 82 are opened (brought to the closed position), can be prevented. The damper 19 can stop the air conditioning air more reliably.

The present application is not limited to the embodiment described above, and it is a matter of course that various improvements, modifications can be made without departing from the scope of the present application.

For example, in the embodiment described above, the downstream fin set 15, which is flat-plate-shaped, is arranged along the longitudinal direction (vertical direction) of the air blow outlet 13A, and the upstream fin set 17, which is flat-plate-shaped, is arranged along the lateral direction; however, modification can be made as appropriate. The downstream fin set 15 may be arranged in the lateral direction, and the upstream fin set 17 may be arranged along the vertical direction. The air blow outlet 13A may have a laterally-elongated shape as viewed from a passenger on the vehicle.

In the embodiment described above, the boss pin 73H is provided on the boss member 73, and the cam insertion portion 75D is provided in the cam member 75; however, no limitation thereto is intended. For example, a configuration in which a projection (such as a pin) is provided on the cam member 75, and a groove or a through hole, into which the projection is to be inserted, is provided in the boss member 73 may be employed.

The numbers, shapes, positions, and the like of the members of the register 10 of the embodiment described above are an example. For example, the number of fins in the downstream fin set 15 is not limited to three, and may be one, two, four or greater. The register 10 may be configured to include only either the downstream fin set 15 or the upstream fin set 17. The camshaft 75B is not necessarily arranged between the insertion hole 74K and the boss pivot 74F when viewed from the axial direction of the camshaft 75B. The bending shape of the cam insertion portion 75D is not limited to the L-shape and may be a shape more acute or obtuse than L. The cam insertion portion 75D may have a shape of an arc connecting the first insertion portion 75E and the second insertion portion 75F. A configuration in which the boss shaft 74F is provided on the boss member 73 and the boss-pivot receiving hole 73F is provided in the case member 74 may be employed. A configuration in which the camshaft 75B is provided on the case member 74 and the camshaft receiving hole 74N is provided in the cam member 75 may be employed.

The joint mechanisms of the present application are not limited to universal joints (universal joints), and may be other joint mechanisms, such as ball joints.

The boss projection of present application is not necessarily columnar in shape as is the boss pin 73H, and may be of another shape, such as rectangular parallelepiped.

The first insertion portion 75E may be arranged at a position closer to the camshaft 75B than the second insertion portion 75F is.

The numbers, shapes, positions, and the like of the bead portions 73D, 74J, and 85G are an example. For example, the number of the bead portions 73D may be five or more. A bead portion for making point contact with the cylindrical portion 73A may be provided on the inner wall of the recess-for-boss 74D.

The register of the present application is not limited to a register for an automobile, and may be a register for use in air conditioning or sending air in a building.

The mechanism that couples the damper 19 with the damper drive mechanism 71 is not limited to a gear mechanism, such as the gear member 76, and may be a structure that uses an arm and a groove, a structure that uses a rack mechanism, and the like.

According to one aspect of the present disclosure, a register comprising: a damper drive mechanism for tilting a damper that tilts between an open position where an air passage is open and a closed position where the air passage is closed by transmitting rotation, while changing a direction thereof, of a control knob transmitted from the control knob via a transmission shaft to the damper to tilt the damper between the open position and the closed position, the damper drive mechanism comprising: a boss member coupled to the control knob via the transmission shaft; a case member holding the boss member rotatably about a boss pivot; and a cam member held by the case member rotatably about a camshaft and coupled to the boss member, the cam member rotating in accordance with rotation of the boss member to tilt the damper, wherein coupling between the transmission shaft and the control knob and coupling between the transmission shaft and the boss member are each made with a joint mechanism, and the case member holds the camshaft at a position offset from a straight line that is along an axial direction of the boss pivot in a direction perpendicular to the axial direction of the boss pivot to rotate the cam member about the camshaft that is eccentric in accordance with the rotation of the boss member.

According to the resister of the present application, when rotation of the control knob is transmitted to the damper via the transmission shaft, the boss member, and the cam member, the cam member is rotated about the camshaft held at the position offset from the boss pivot, which is the rotation center of the boss member. Thus, by causing the cam member to rotate about the axis eccentric from the boss member, a manner of rotation of the cam member relative to the boss member can be adjusted, and excessive or insufficient tilting of the damper can be eliminated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

10 Register, 11 retainer, 19 damper, 21 dial control knob (control knob), 23 air passage, 25 air-blowing direction, 65 transmission shaft, 71 damper drive mechanism, 73 boss member, 73E bottom portion, 73G flange portion, 73H boss pin (boss projection), 74 case member, 74D recess-for-boss (second recess), 74F boss pivot, 74Jbead portions (cover bead portions), 74K insertion hole, 74L recess-for-cam (first recess), 74E, 74M bottom portion, 75 cam member, 75B camshaft, 75D cam insertion portion, 75E first insertion portion, 75F second insertion portion, 75G connecting portion, 76 gear member, 76A tooth portions (cam tooth portions), 81 first damper plate, 81B damper gear portion (first damper teeth portion), 82 second damper plate, 82B damper gear portion (second damper teeth portion), 85 retainer member (mounting portion), 85G bead portions (retainer bead portions), 97 straight line, and 101 extra area.

The invention claimed is:

1. A register comprising:

a damper drive mechanism for tilting a damper that tilts between an open position where an air passage is open and a closed position where the air passage is closed by transmitting rotation, while changing a direction thereof, of a control knob transmitted from the control knob via a transmission shaft to the damper to tilt the damper between the open position and the closed position, the damper drive mechanism comprising:

a boss member coupled to the control knob via the transmission shaft;

a case member holding the boss member rotatably about a boss pivot; and a cam member held by the case member rotatably about a camshaft and coupled to the boss member, the cam member rotating in accordance with rotation of the boss member to tilt the damper, wherein coupling between the transmission shaft and the control knob and coupling between the transmission shaft and the boss member are each made with a joint mechanism, and the case member holds the camshaft at a position offset from a straight line that is along an axial direction of the boss pivot in a direction perpendicular to the axial direction of the boss pivot to rotate the cam member about the camshaft that is eccentric in accordance with the rotation of the boss member.

2. The register according to claim 1, wherein the boss member includes a boss projection, the case member includes an insertion hole, into which the boss projection is to be inserted, the cam member includes a cam insertion portion, into which the boss projection is to be inserted via the insertion hole, and the boss projection moves, as the boss member rotates about the boss pivot, in the cam insertion portion while being engaged in the cam insertion portion and simultaneously moves in the insertion hole.

3. The register according to claim 2, wherein the insertion hole has a shape of an arc cut out about the boss pivot, and the camshaft is provided between the insertion hole and the boss pivot when viewed from an axial direction of the camshaft.

4. The register according to claim 3, wherein the cam insertion portion includes a first insertion portion, into which the boss projection is to be inserted when the damper is in the open position, and a second insertion portion, into which the boss projection is to be inserted when the damper is in the closed position, and a first distance between the first insertion portion and the camshaft is longer than a second distance between the second insertion portion and the camshaft.

5. The register according to claim 4, wherein the cam insertion portion includes a connecting portion that connects the first insertion portion and the second insertion portion and has a shape bent at the connecting portion, and a corner portion, which is bent, of the connecting portion is provided on opposite side of the second insertion portion with respect to a straight line connecting the camshaft and the first insertion portion.

6. The register according to claim 2, further comprising a fin for changing an air-blowing direction of air blown out from the register, wherein the fin rotates in accordance with an operation on the control knob, and in the cam insertion portion, an extra area, into which the boss projection is to be inserted when the control knob is further rotated after the damper has reached the closed position, is formed at an end portion, the end portion being on a side of the closed position, of a traveling route through which the boss projection travels when the damper tilts between the open position and the closed position.

7. The register according to claim 3, wherein the boss member includes a circular bottom portion including the boss projection, the cam member is disk-shaped, the case member includes a first recess that stores the cam member and is circular in cross-section, and a second recess that stores the bottom portion of the boss member and is circular in cross-section, and a bottom portion of the first recess is formed at a position offset from a bottom portion of the second recess along a direction connecting the camshaft and the boss pivot as viewed from the axial direction of the camshaft.

8. The register according to claim 1, further comprising a retainer being provided with the air passage and including a mounting portion, on which the boss member is mounted, wherein the boss member includes a flange portion interposed between the mounting portion and the case member in the axial direction of the boss pivot, the mounting portion includes a plurality of retainer bead portions projecting toward the flange portion, the case member includes a plurality of cover bead portions projecting toward the flange portion, and the boss member is pinched at the flange portion by the plurality of retainer bead portions and the plurality of cover bead portions from opposite sides of the axial direction of the boss pivot to be rotatably supported relative to the mounting portion and the case member.

9. The register according to claim 1, wherein the damper includes a first damper plate including a first damper teeth portion, and a second damper plate including a second damper teeth portion, the cam member includes a gear member that closes the air passage by meshing with both the first damper teeth portion and the second damper teeth portion to tilt the first damper plate and the second damper plate in directions separating from each other, the gear member includes cam tooth portions along a circular outer periphery to rotate about a straight line that is along the axial direction of the camshaft as the cam member rotates, the first damper teeth portion meshes with the cam tooth portions in a state of being supported rotatably about a damper pivot that is along a direction perpendicular to the axial direction of the camshaft, the second damper teeth portion meshes with the cam tooth portions in a state of being supported rotatably about the damper pivot, and is provided on the opposite side of the first damper teeth portion with respect to the gear member in a direction that is along the damper pivot, the first damper teeth portion is formed on the first damper plate at an end portion on the gear member side, and the second damper teeth portion is formed on the second damper plate at an end portion on the gear member side.

* * * * *